United States Patent
Teig et al.

(10) Patent No.: US 9,501,606 B2
(45) Date of Patent: Nov. 22, 2016

(54) IDENTIFYING THE CAUSE OF TIMING FAILURE OF AN IC DESIGN USING SEQUENTIAL TIMING

(71) Applicant: Altera Corporation, San Jose, CA (US)

(72) Inventors: Steven Teig, Menlo Park, CA (US); Andrew Caldwell, Santa Clara, CA (US)

(73) Assignee: Altera Corporation, San Jose, CA (US)

(*) Notice: Subject to any disclaimer, the term of this patent is extended or adjusted under 35 U.S.C. 154(b) by 0 days.

(21) Appl. No.: 14/582,984

(22) Filed: Dec. 24, 2014

(65) Prior Publication Data

US 2015/0324513 A1 Nov. 12, 2015

Related U.S. Application Data

(60) Provisional application No. 61/921,536, filed on Dec. 30, 2013.

(51) Int. Cl.
*G06F 9/455* (2006.01)
*G06F 17/50* (2006.01)

(52) U.S. Cl.
CPC ......... *G06F 17/5081* (2013.01); *G06F 17/505* (2013.01); *G06F 17/5009* (2013.01)

(58) Field of Classification Search
USPC ................................................ 716/113, 134
See application file for complete search history.

(56) References Cited

U.S. PATENT DOCUMENTS

| | | | | |
|---|---|---|---|---|
| 8,701,063 B1* | 4/2014 | Shrivastava | ........ | G06F 17/5031 716/108 |
| 8,863,067 B1* | 10/2014 | Caldwell | ............. | G06F 17/5031 716/132 |
| 2002/0104064 A1* | 8/2002 | Sasaki | ................... | G06F 17/505 716/113 |
| 2003/0226122 A1* | 12/2003 | Hathaway | ............. | G06F 17/505 716/134 |
| 2006/0064658 A1* | 3/2006 | Minonne | ............... | G06F 17/505 716/103 |
| 2008/0276209 A1* | 11/2008 | Albrecht | ............. | G06F 17/5031 716/113 |
| 2010/0180242 A1* | 7/2010 | Kalafala | ............. | G06F 17/5031 716/105 |
| 2012/0047477 A1* | 2/2012 | Kalafala | ............. | G06F 17/5031 716/108 |

* cited by examiner

*Primary Examiner* — Brian Ngo

(57) ABSTRACT

A method of optimizing timing performance of an IC design is provided. The IC design is expressed as a graph that includes a plurality of nodes representing IC components. The method identifies several paths in the graph that each starts from a timed source node and ends to a timed target node. Each path includes several clocked elements and several computational elements. The method optimizes the timing performance of the IC design by skewing clock signals to one or more clocked elements to satisfy a set of timing constraints. For each identified path, the method determines the ratio of signal travel time from the source node to the destination node to a maximum time allocated for the data signal to travel from the source node to the target node. When the IC design fails timing constraints, the path that has a maximum determined ratio as a cause for timing failure.

18 Claims, 25 Drawing Sheets

IDENTIFYING THE CAUSE OF TIMING FAILURE OF AN IC DESIGN USING SEQUENTIAL TIMING

CLAIM OF BENEFIT TO PRIOR APPLICATIONS

This application claims the benefit of U.S. Provisional Patent Application 61/921,536 entitled, "Optimizing IC Performance using Sequential Timing," filed Dec. 30, 2013. The contents of U.S. Provisional Application Ser. No. 61/921,536 are incorporated herein by reference.

BACKGROUND

An IC is a device that includes numerous electronic components (e.g., transistors, resistors, diodes, etc.) that are embedded typically on the same substrate, such as a single piece of semiconductor wafer. These components are connected with one or more layers of wiring to form multiple circuits, such as Boolean gates, memory cells, arithmetic units, controllers, decoders, etc. An IC is often packaged as a single IC chip in one IC package, although some IC chip packages can include multiple pieces of substrate or wafer.

Electronic Design Automation (EDA) tools are automated tools used in IC design. Placement and routing are steps in automatic design of ICs in which a layout of a larger block of the circuit or the whole circuit is created from layouts of smaller sub-blocks. During placement, the positions of the sub-blocks in the design area are determined. These sub-blocks are interconnected during routing. A placer assigns exact locations for circuit components within the IC chip's core area. A placer typically has several objectives such as minimizing total wire length, timing optimization, reducing congestion, and minimizing power. The placer takes a given synthesized circuit netlist with a technology library and produces a placement layout. The layout is optimized according to a set of placer objectives.

The maximum delay through the critical path of a chip determines the clock cycle and, therefore, the speed of the chip. The timing optimization is performed by different EDA tools to ensure that no path exists with delay exceeding a maximum specified delay.

BRIEF SUMMARY

Some embodiments provide a method of optimizing timing performance of an IC design. The IC design is expressed as a graph that includes several nodes representing IC components. The method identifies a path in the graph that starts from a timed source node and ends at a timed target node. The path includes several clocked elements and several computational elements. The method optimizes the timing performance of the IC design by skewing clock signals to a set of clocked elements without changing the position of any clocked element relative to the positions of the computational elements in the path. The clock signal of at least one clocked element is skewed by more than a clock period. The method implements the IC design by using the optimized IC design.

In some embodiments, the identified path is a loop where the source node and the target node are the same node. In some embodiments, the clocked elements are registers, flip-flops, or latches. A timed node is either a primary input through which the IC receives external inputs, a primary output through which the IC sends outputs to external circuits, a storage element, or a node with timing constraints requiring a clock signal for the node to arrive at a fixed time.

Some embodiments provide a method of optimizing timing performance of an IC design. The IC design is expressed as a graph that includes several nodes representing IC components. The method identifies a path in the graph that starts from a timed source node and ends at a timed target node. The path includes several clocked elements and several computational elements. The method optimizes the timing performance of the IC design by skewing clock signals to a set of clocked elements without changing the position of any clocked element relative to the position of the computational elements in the path. The method performs simulation on the optimized IC design. The method provides the result of the simulation as clock skew scheduling of the IC design. The method maps the optimized IC design into a retimed IC design. The retimed IC design receives the same input as the optimized IC design and generates the same output as the optimized IC design. The retimed IC design includes at least (i) a clocked element removed from an input path of a computational element and a clocked element added to an output path of the combinational element or (ii) a clocked element removed from an input path of a computational element and a clocked element added to the output path of the combinational element. The method implements the IC design by using the retimed IC design.

In some embodiments providing the result of the simulation as a clock skew scheduling includes providing arrival times of data and clock signals at inputs of the clocked and computational logic elements and providing available times of the data signals at output of the clocked elements and computational logic elements. The relative position of the clocked elements and the computational logic elements in the IC design prior to optimization is maintained in the simulation results.

Some embodiments provide a method of optimizing timing performance of an IC design. The IC design is expressed as a graph that includes several nodes representing IC components. The method identifies a group of paths in the graph. Each identified path starts from a timed source node and ends at a timed target node. Each path includes several clocked elements and several computational elements. The method optimizes the timing performance of the IC design by skewing clock signals to one or more clocked elements in a set of paths to satisfy a set of timing constraints. The method identifies a path that (i) includes a set of edge-triggered clocked elements and (ii) does not satisfy the set of timing constraints. The method replaces each edge-triggered clocked element in the identified path with a level-sensitive clocked element. After replacing, the method optimizes the timing performance of the IC design by skewing clock signals to one or more clocked elements in the identified path. In some embodiments at least one of the edge-triggered clocked elements is a register or a flip-flop and at least one of the level-sensitive clocked element is a latch.

Some embodiments provide a method of optimizing timing performance of an IC design. The IC design is expressed as a graph that includes several nodes representing IC components. The method identifies a group of paths in the graph. Each identified path starts from a timed source node and ends at a timed target node. Each identified path includes several clocked elements and several computational elements. The method optimizes the timing performance of the IC design by skewing clock signals to one or more clocked elements in a set of paths to satisfy a set of timing constraints. The method, for each identified path, determines the ratio of data signal travel time from the source node to the destination node to the maximum time allocated for the data signal to travel from the source node to the target node. The method determines that the IC design has failed a set of timing constraints when one or more of the paths have a ratio greater than one. The method identifies a path that has the maximum determined ratio as the cause for timing failure.

In some embodiments, the method receives a modification of the user design for the path with the maximum identified ratio from a designer of the IC design. The method optimizes the timing performance of the modified IC design by skewing clock signals to one or more clocked elements in a set of paths in the plurality of paths to satisfy a set of timing constraints.

In some embodiments, the ratio is calculated as a percentage value and the path that has the maximum determined ratio is identified as the path that is contributing the highest percentage to the overall timing failure of the IC design. In some embodiments, the data signal requires several clock cycles to travel between the source and target nodes of one or more paths. In some embodiments, one or more identified paths in the graph are loops where the source node and the target node of each loop is the same node.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Retiming is a timing optimization technique that moves the clocked elements in a netlist of an IC design without changing the position of the combinational logic elements in order to optimize the performance of the IC without changing the IC output behavior. Although retiming optimizes IC performance much better than a traditional clock skew scheduling (where the clocks aren't skewed by much), the use of retiming has been limited in practice. The main reason for retiming unpopularity is the fact that retiming changes the topology of the netlist by moving clocked elements to different locations with respect to combinational logic elements. As a result of changing the topology, the previous simulation models and test benches cannot be used for the retimed design if the test bench reaches into the design under test. If the test bench does not reach the design under test, the retiming does not invalidate the test bench. However, the retimed netlist used in simulation does not resemble the original IC design that the user wants to optimize. As a result, debugging is made much harder for the users. For instance, if the test fails, the users do not have any functional correlation to anything in the middle of their design to help them in debugging.

Accordingly, some embodiments provide a method of optimizing an IC design by using retiming that changes the netlist topology while presenting the simulation results to the user as clock skew scheduling of the netlist used in the original user design.

Figure 1:
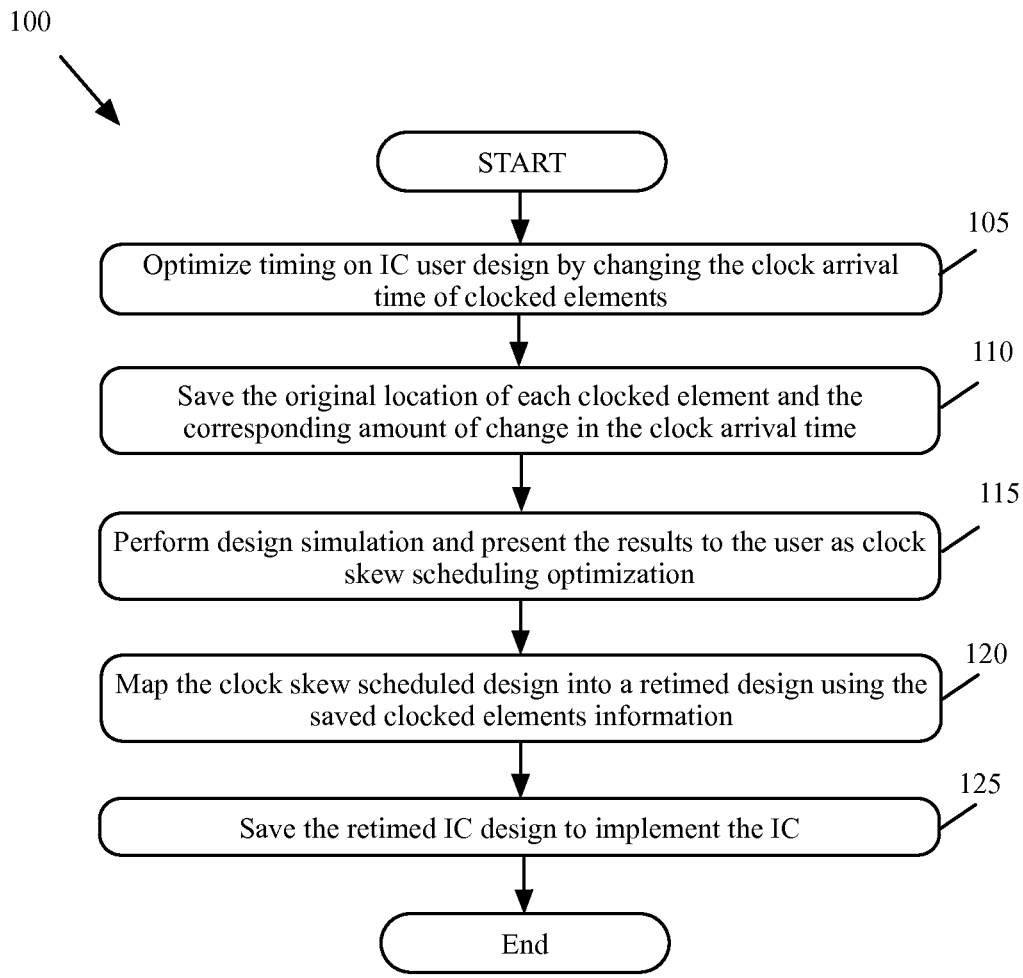
FIG. 1 conceptually illustrates a process that utilizes retiming to implement an IC design but presents the design simulations to the users as clock skew scheduling in some embodiments of the invention.

FIG. 1 conceptually illustrates a process 100 that utilizes retiming to implement an IC design but presents the design simulations to the users as clock skew scheduling in some embodiments of the invention. As shown, the process optimizes (at 105) timing on an IC design by changing the clock arrival time of the clocked elements in the IC design. As described further below, the clock arrival times of the clocked elements in each path can be changed by any arbitrary amount as long as the clock arrival times stay within the time range that the data signal becomes available at the primary input of the path and the time that the data signal is required by the design constraints to reach the primary output of the path.

The process then saves (at 110) the original location of each clocked element and the corresponding amount of change in the clock arrival time. The process then performs (at 115) design simulation and presents the results to the user as clock skewing scheduling optimization.

The process then maps (at 120) the clock skew scheduled design into a retimed design by using the saved clock elements information. The process then saves (at 125) the retimed IC to implement the IC. The process then ends.

Several more detailed embodiments of the invention are described in sections below. Before describing these embodiments further, several terms and concepts used in the disclosure are described below in Section I. This discussion is followed by the discussion in Section II of several embodiments for implementing an IC design by using retiming and presenting the optimizations as clock skew scheduling. Next, Section III describes replacing edge-triggered clocked elements with level-sensitive clocked elements to improve the performance of an IC in some embodiments. Next, Section IV describes methods of analyzing timing performance of an IC and identifying the reason why the timing fails. Lastly, Section V describes an electronics system with which some of the embodiments of the invention are implemented.

I. TERMS AND DEFINITIONS

A. Graphical Representation of IC Designs

A netlist is a graph representation of an IC design. The graph is represented by a collection of node and edges. The nodes represent components of the IC and the edges represent connections between these components. The edges connect the nodes but do not go through (i.e., do not encompass) any nodes. In an IC design, each component lies on one or more signal paths ("paths"). A path is a sequence of nodes and edges in a netlist. The starting node is referred to as the source node and the end node is referred to as the sink, destination, or target node. The source and target nodes are also referred to as endpoints of a path. The source and target designations of the endpoints are based on the direction of the signal flow through the path.

A timed path is a path whose both endpoints are timed elements. Timed elements include primary inputs (through which the circuit receives external input), primary outputs (through which the circuit sends outputs to external circuits), clocked elements, storage elements, or any node with timing constraints (e.g., a node with a fixed time, either because the node cannot be retimed or the node is specified as when it should occur).

The clocked elements are referred to as sequential elements and are circuits in which the outputs depend on the current value of the element inputs as well as the past history of the element inputs. Examples of clocked elements include registers and latches. In contrast, combinational elements are circuits in which the outputs are only functions of the current values of the inputs. Example of combinational elements include circuits that implement Boolean logic such as AND, OR, NAND, NOR, and NOT gates, multiplexers, and look-up tables (LUTs).

Figure 2:
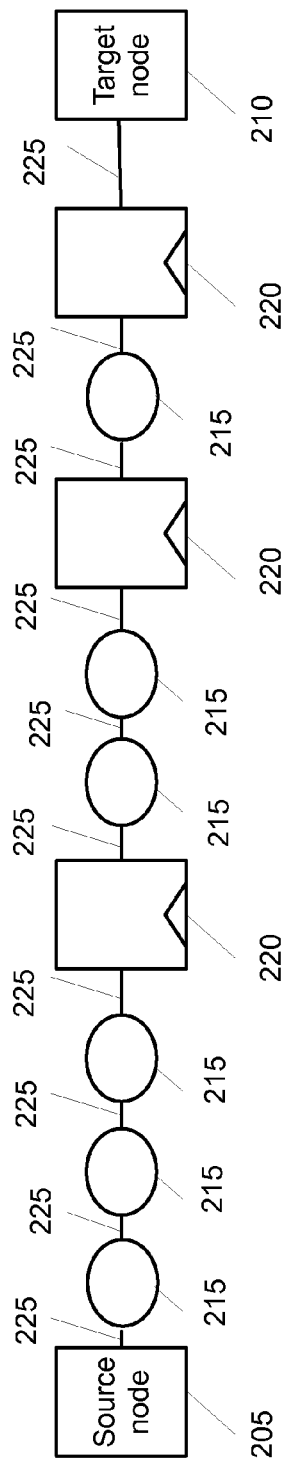
FIG. 2 conceptually illustrates a path that includes computational and clocked elements between a source node and a target node in some embodiments.

FIG. 2 illustrates a timed path 200 between a source node 205 and a target node 210 in some embodiments. The path 200 includes six computational elements 215 (shown as ellipses), three clocked elements 220 (shown as rectangles), and ten edges 225. FIG. 2 also shows other smaller timed paths. For instance, the path starting from the source node 205 and ending at clocked element 220 is also a timed path. In order for a final IC design (after all timing and circuit design optimizations are performed) to meet timing requirements, total accumulated delay (including computation delays and signal propagation delays) on each timed path must be less than or equal to one clock period.

The arrival time of a signal is the time elapsed for a signal to arrive at a certain point. The reference, or time 0, is taken from a source node. In some embodiments, when the source node is a primary input, the reference time is taken as the arrival time of a signal received at the primary input. Also, when the source node is a clocked element, the reference time is taken as the time a clock signal is received at the clocked element.

To calculate the arrival time of a signal at a node, delay calculation for all components and edges on the path are required. The required time is the latest time at which a signal can arrive without making the clock cycle longer than desired (e.g., as specified in the design constraints).

The time difference between the actual arrival time of a signal and the required arrival time of the signal is referred to as slack. The slack for a node is expressed by the following equation (A):

$$\text{slack} = \text{required arrival time} - \text{arrival time} \quad (A)$$

A positive (or zero) slack at a node indicates that the node has met its timing requirements. A positive slack also implies that the arrival time of the signal at that node may be increased by the value of the slack without affecting the overall delay of the circuit. Conversely, a negative slack implies that a path is too slow. Therefore, the path must be sped up (or the reference signal delayed) if the whole circuit is to work at the desired speed. A critical path is defined as a timed path with largest negative slack.

B. Combinational Delay

Combinational delay computation is performed on a path that starts from a clocked element source node and ends at a clocked element target node without encompassing any other clocked elements. Alternatively, the path can either start with any timed element and end to a clocked element or start with a clocked element and end to a timed element without encompassing any other clocked elements. The delay starts at zero and is accumulated as the path is traversed in the signal direction from a source node to a target node.

Figure 3:
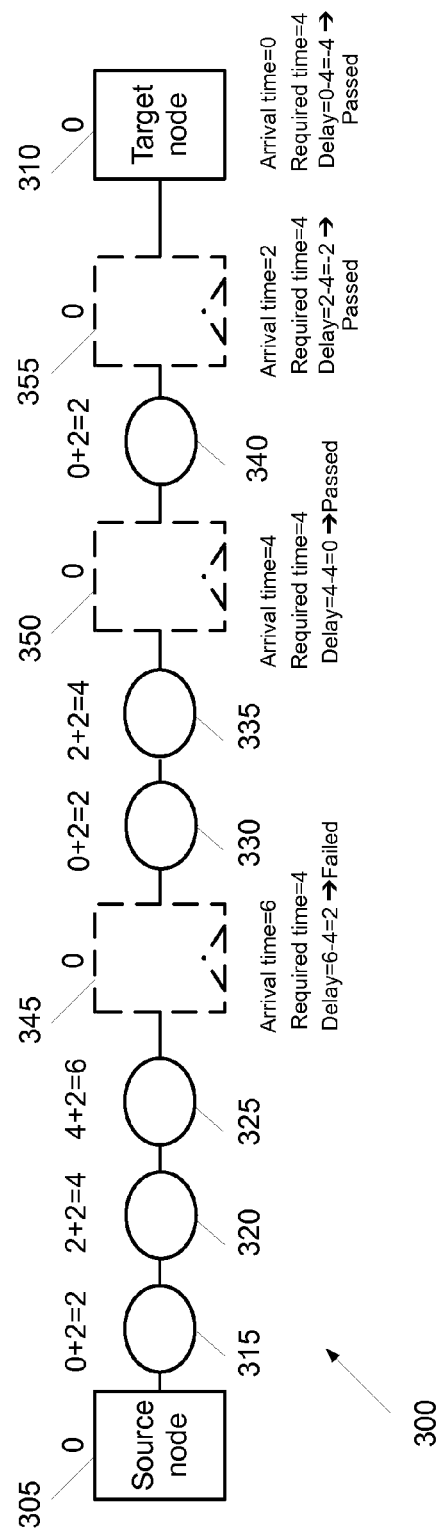
FIG. 3 conceptually illustrates an example of combinational delay computation in some embodiments.

FIG. 3 conceptually illustrates a timed path 300 in some embodiments. As shown, path 300 starts from source node (e.g., a primary input node) 305 and ends at a target node (e.g., a primary output node 310). The path includes six computational elements (shown as ellipses) 315-340 and three clocked elements (shown as rectangles) 345-355. For this example, the clock period is assumed to be four time units. Also, for simplicity it is assumed that each computational element takes two time units to perform its operation.

Furthermore, for simplicity, it is assumed that there are no delays attributed to wiring lengths in this example. Alternatively, the delays attributed to wiring lengths between two endpoints can be added to the delay of the target node. As shown in FIG. 3, path 300 includes four paths. These paths are the smaller paths that either (1) start from a clocked element source node and end to a clocked element target node, (2) start from a timed element source node and end to a clocked element target node, or (3) start from a clocked element source node and end to a timed element target node. None of these paths encompass any other clocked elements. These four paths are the paths between (1) timed element 305 and clocked element 345, (2) clocked element 345 and clocked element 350, (3) clocked element 350 and clocked element 355, and (4) clocked element 355 and timed element 310. The combinational delay for each of these paths is the accumulated delays between the source and target nodes of the corresponding path and is calculated by adding all computation and propagation delays between the source and target nodes of the corresponding path.

In FIG. 3, the accumulated combinational delay of each node is shown on top of the node. Since the clock period is assumed to be four time units, the required time of signal at each clocked element 345-355 and the primary output 310 is four units. As shown, when the combinational delay computations are compared with the required times for each target node, the timing requirements for the first target node (345) fails and the timing requirement for the other three target nodes (350, 355, and 310) pass. The signal arrival time, signal required time, and the delay difference is shown under timed elements 345-355 and 310. Since the path between 305 and 345 fails the timing requirement, the overall path 300, which includes the failed path, also fails the timing requirements.

C. Sequential Delay

Sequential delay computation is similar to combinational delay computation, except sequential delay computation accounts for paths (referred herein as sequential paths) that can go through clocked elements (or sequential elements). In other words, sequential delay is computed for a sequential path, which is a path (i) whose start and end points are either primary inputs, primary outputs, storage elements, or any node with timing constraints and (ii) goes through clocked elements. A sequential path can also include combinational elements.

In contrast to a sequential path, a combinational path is a path that includes only combinational elements. The sequential path is, therefore, the generalization of combinational path to include the case where there are additional clocked (i.e., sequential) nodes in the middle of the path. In other words, the set of sequential paths is a superset of the set of the set of combinational paths.

A sequential path can also be a loop (with a single node as both the source and the target node) that goes through clocked and combinational elements. The single node in the loop serves as both start and end points and is a primary input, a primary output, a storage element, or any node with timing constraints.

Figure 4:
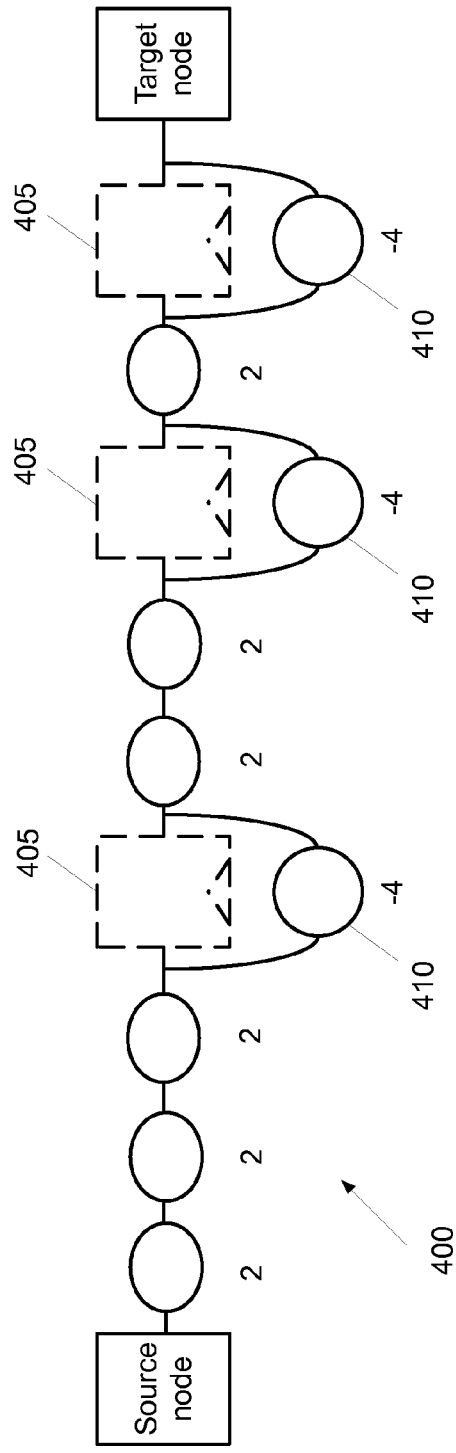
FIG. 4 illustrates a path in which clocked elements are conceptually replaced with non-computational elements with negative delays.

FIG. 4 conceptually illustrates a sequential path 400 in some embodiments. This path is similar to path 300. As shown in FIG. 4, the clocked elements 405 are conceptually replaced by non-computational elements 410 with a negative delay equal to one clock period which accounts for the fact that the required time between two adjacent clocked elements (or a clocked element and an adjacent primary input or output) is one clock period. In FIG. 4, the delays associated with each node are shown under each node. In some embodiments, a sequential path can also start from or end to a clocked element that cannot be retimed. In these embodiments, the outputs of the clocked elements that cannot be retimed are considered to occur at time zero.

Figure 5:
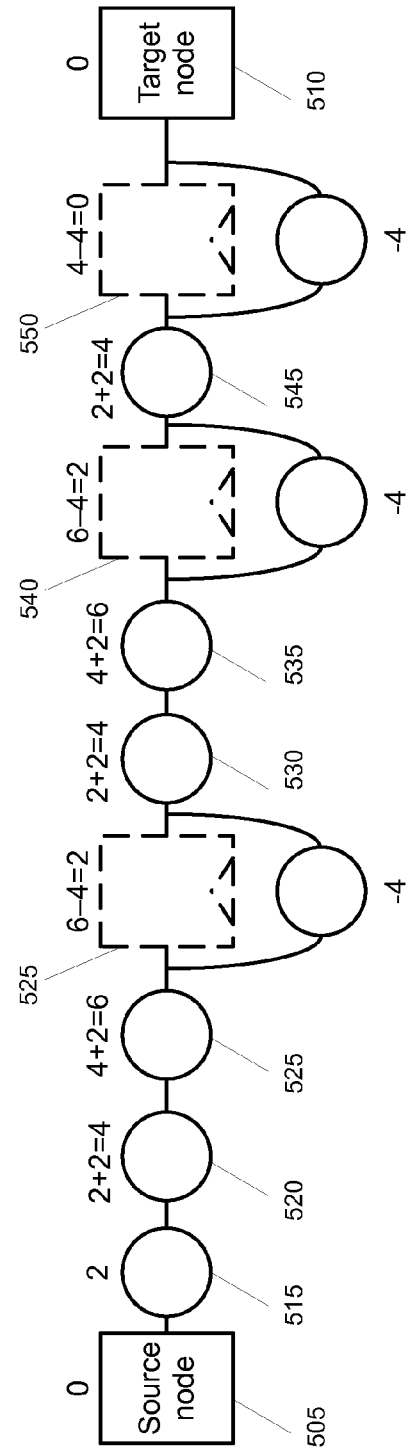
FIG. 5 illustrates the results of sequential delay computation for the path shown in FIG. 4.

FIG. 5 illustrates the results of sequential delay computation for path 400 shown in FIG. 4. First, the source node 505 and target node 510 are identified. The clocked elements are not identified as source or target nodes. In other words, the delays are not reset to zero after each clocked element. Instead a delay equal to one clock period is subtracted from the accumulated delay to account for each clocked element. As shown, the accumulated delay for the source node 505 is set to 0.

Next, the delays are accumulated through the clocked elements. Since clocked elements are assigned negative delays, the effect of each clocked element is subtraction of one clock period from the accumulated delay. The delay is accumulated until the target node 510 is reached. The results of these computations for each node are shown on top of the nodes in FIG. 5.

When the accumulated delay of the target node is more than one clock period, the sequential path from the source node to the target node cannot meet its timing requirements with the given clock period. On the other hand, when the accumulated delay of the target node is less than or equal to one clock period, the path can meet its timing requirements. For instance, in FIG. 5, the accumulated delay of the target node 510 is zero. This accumulated delay is the sequential delay of the sequential path that starts from the source node 505 and ends at the target node 510. The sequential delay being less than one clock period indicates that there exists a retiming of the clocked elements such that all elements meet their required timing. In the example of FIG. 5, since the accumulated delay for the target node is zero and the clock period is 4 time units, the path 500 can be retimed by moving the clocked elements across the path until the path meets its timing requirement. Retiming of the path shown in FIG. 5 is described by reference to FIG. 10, below.

Sequential timing refers to optimizing the circuit performance by balancing the delays between the clocked elements without changing the input/output behavior of the circuit. Sequential timing methods include clock skew scheduling and retiming as described below.

D. Clock Skew Scheduling

Due to difference in interconnect delays in a clock distribution network, the clock signal of the same phase does not arrive at exactly the same time for each clocked element. Clock skew is the difference between clock arrival times of adjacent clocked elements. Clock skew scheduling is used to optimize the IC performance by intentionally assigning different clock arrival times to different clocked elements in order to borrow time from the paths with larger slacks and to use it in more time critical paths. Different clock arrival times are provided to clocked elements either by adding buffers and using delays in the clock paths of the clock distribution network or by providing multiple clock domains. Clock skew scheduling optimization is performed without moving the location of the clocked elements in the netlist in respect to combinational elements and thereby preserves the netlist structure.

In addition, the clock arrival times of two adjacent clocked elements have to satisfy setup and hold time constraints. The setup time constraint ensures that the signal from a clocked element to the next clocked element has enough time to stabilize its value before the next clocked element stores the value. The hold time constraint ensures that the signal from a clocked element does not overwrite the previous data before the next clocked element stores the data.

In order to prevent double clocking (the effect of the same clock pulse triggering the same data into two adjacent storage elements) the constraint defined in the following expression (B) has to be satisfied in a traditional clock skew scheduling scheme.

$$ti+d\min(i,j) \geq tj+T_{hold} \quad\quad\quad (B)$$

where dmin (i, j) is the minimum signal delay from clocked element I to clocked element j; ti and tj are clock arrival time (or clock latencies) at clocked elements i and j respectively; and $T_{hold}$ is the hold time of clocked element j.

Furthermore, zero clocking (where the data reaches a storage element too late relative to the following clock pulse) in a traditional clock skew scheduling scheme is prevented by satisfying the constraint defined in the following expression (C).

$$ti+d\max(i,j) \leq T+tj-T_{setup} \quad\quad\quad (C)$$

where T is the clock period, dmax(i, j) is the maximum signal delay from clocked element i to clocked element j; ti and tj are clock arrival time (or clock latencies) at clocked elements i and j; and $T_{setup}$ is the clock set up time at clocked element.

As described further below, some embodiments of the invention do not limit skewing of the clock to less than a clock period nor require satisfying constraints (B) and (C) for consecutive clocked elements. Instead, the clock signal to each clocked element in a sequential path is allowed to be skewed by any arbitrary value as long as the clock signal arrives at each clocked element any time between the arrival time of data signal at the primary input of the path and the required time of the output signal at the primary output of the path.

Figure 6:
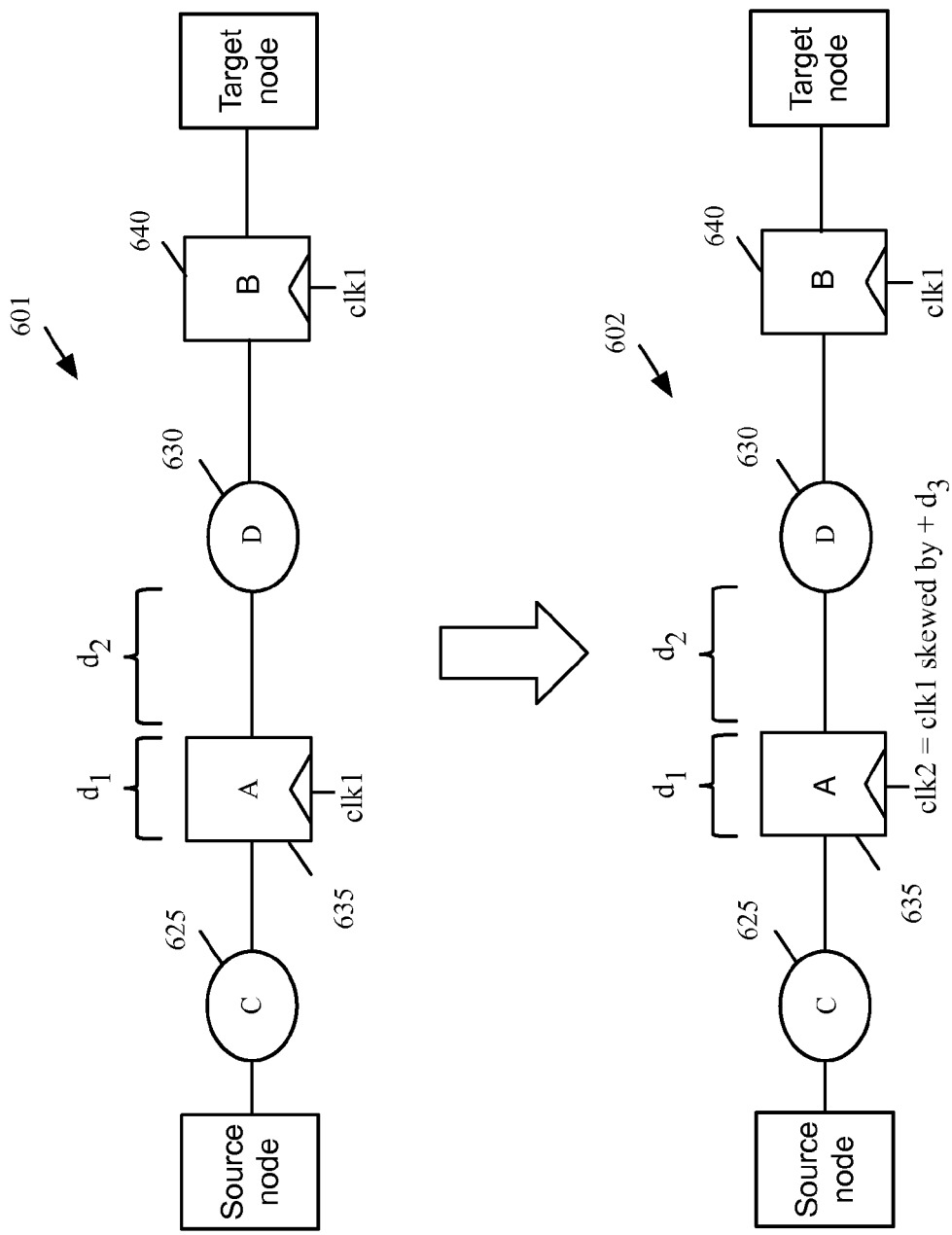
FIG. 6 conceptually illustrates clock skew scheduling of clocked elements in a portion of a netlist.

FIG. 6 conceptually illustrates clock skew scheduling of clocked elements in a portion of a netlist. The figure is shown in two stages 601 and 602. As shown in stage 601, the portion of the netlist is a sequential path that includes two combinational logic elements 625 and 630 as well as two clocked elements 635 and 640. In this example, the clocked elements are triggered on the rising edge of the clock, the clocked element delay (referred to as clock-to-Q delay is the delay for the data signal to become available at the output of the clocked element after receiving the rising edge of the clock) is d1, and the delay for the data signal to travel from the output of clocked element 635 through the wires to reach the input of combinational logic 630 is d2.

Figure 7:
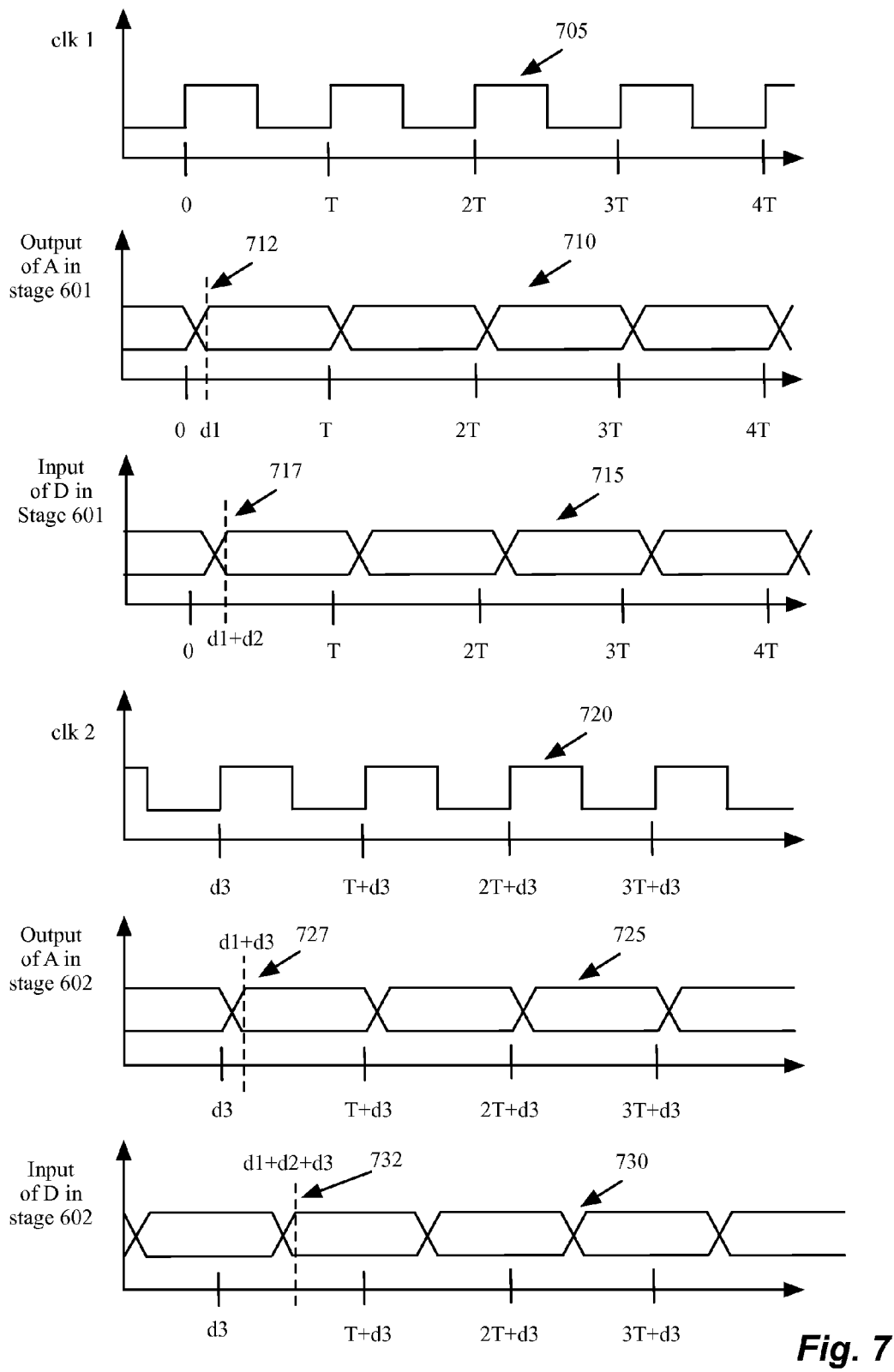
FIG. 7 illustrates a timing diagram for FIG. 6.

FIG. 7 illustrates a timing diagram for FIG. 6. As shown, clk1 signal 705 is provided to the clock elements in stage 601. In this example, the clock period is T and the first rising edge of the clock is received at clock element 635 at time 0 and the subsequent rising edges of the clock arrive at times T, 2T, 3T, etc.

Since the delay through the clocked element 635 is d1, the data signal 710 at the output of clocked element 635 becomes available (as shown by the dashed line 712) after a delay of d1. The data signal 715 at the input of combinational logic 630 arrives (as shown by the dashed line 717) after a further delay of d2 to go through the wires between the output of clocked element 635 and the input of combinational logic 630.

In stage 602 in FIG. 6, the netlist is optimized by skewing the clock input of clocked element 635 by a delay of $+d_3$. The clocked element remains on the output path of the combinational logic element 625. As shown in FIG. 7, the clock signal 720 for clocked element 635 is skewed by a delay of d3. Accordingly, the riding edge of clock signal 720 occurs with a delay of d3 compared to the rising edge of clock signal 705.

Since the delay through the clocked element 635 is d1, the data signal 725 at the output of clocked element 635 in stage 602 becomes available at the time d1+d3 (as shown by the dashed line 727) after the further delay of d1. The data signal 730 at the input of combinational logic 630 arrives at time d1+d2+d3 (as shown by the dashed line 732) after a further delay of d2 to go through the wires between the output of clocked element 635 and the input of combinational logic 630.

The clock period in FIG. 7 is T unit of time. Therefore, the above scenario repeats after each T unit of time. The optimization using a traditional clock skew scheduling is limited to skewing the clock by an amount that does not interfere with the required time of the signal at the inputs of the combinational logic 630 as well the setup and holding time of the next (or the previous) consecutive clocked element in the netlist. Also, since the positions of the clocked elements are not changed during clock skew scheduling, the amount of clock skew cannot exceed the clock period, T.

One reason that skewing the clock by more than one period in traditional clock-skew scheduling fails is the case where doing so results in a combinational sub-path of a sequential path where the time difference between the adjacent clocked elements is more than two clock periods. In such cases, there is more than one computation "in flight" on that sub path. This condition is sometimes referred to as "wave pipelining". The condition can cause problems by resulting in race conditions. As described further below, some embodiments of the invention provide novel techniques that do not limit skewing of the clock to less than a clock period. Instead, the clock signal to each clocked element in a sequential path is allowed to be skewed by any arbitrary value as long as the clock signal arrives at each clocked element any time between the arrival time of data signal at the primary input of the path and the required time of the output signal at the primary output of the path. In some embodiments, clock-skew scheduling is performed by skewing the clocks by amounts that are much larger than a clock period. These embodiments insert a collection of transparent level-sensitive clocked elements (or latches) in the middle of the path, which resolves the race condition issue.

E. Retiming

Retiming moves the clocked elements in the netlist in relation to the position of the combinational logic elements in order to optimize the performance of the IC without changing the IC output behavior. Clocked elements are moved from the input paths of combinational logic elements to their output paths or vice versa. A clock element can be removed from all input paths of a combinational logic element and added to all output paths of the combinational logic element. Alternatively, a clock element can be removed from all output paths of a combinational logic element and added to all input paths of the combinational logic element.

Figure 8:
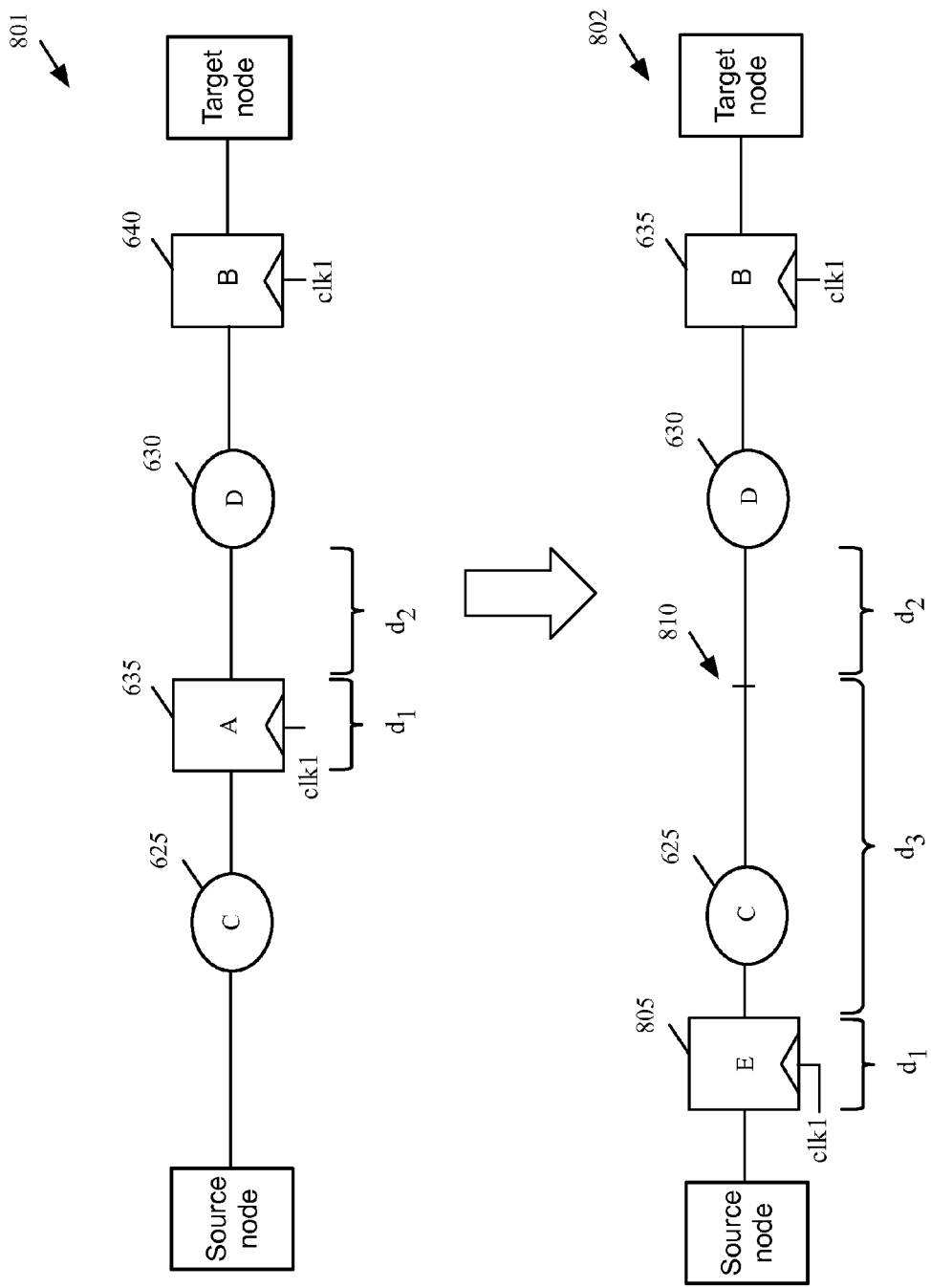
FIG. 8 conceptually illustrates retiming of clocked elements in a portion of a netlist in some embodiments of the invention.

FIG. 8 conceptually illustrates retiming of clocked elements in a portion of a netlist in some embodiments of the invention. The figure is shown in two stages 801 and 802. Similar to stage 601 shown in FIG. 6, the netlist shown in stage 801 in FIG. 8 includes two combinational logic elements 625 and 630 as well as two clocked elements 635 and 640. Also, the clocked elements are triggered on the rising edge of the clock, the clocked element delay is d1, and the delay for the data signal to travel from the output of clocked element 635 through the wires to reach the input of combinational logic 630 is d2.

Figure 9:
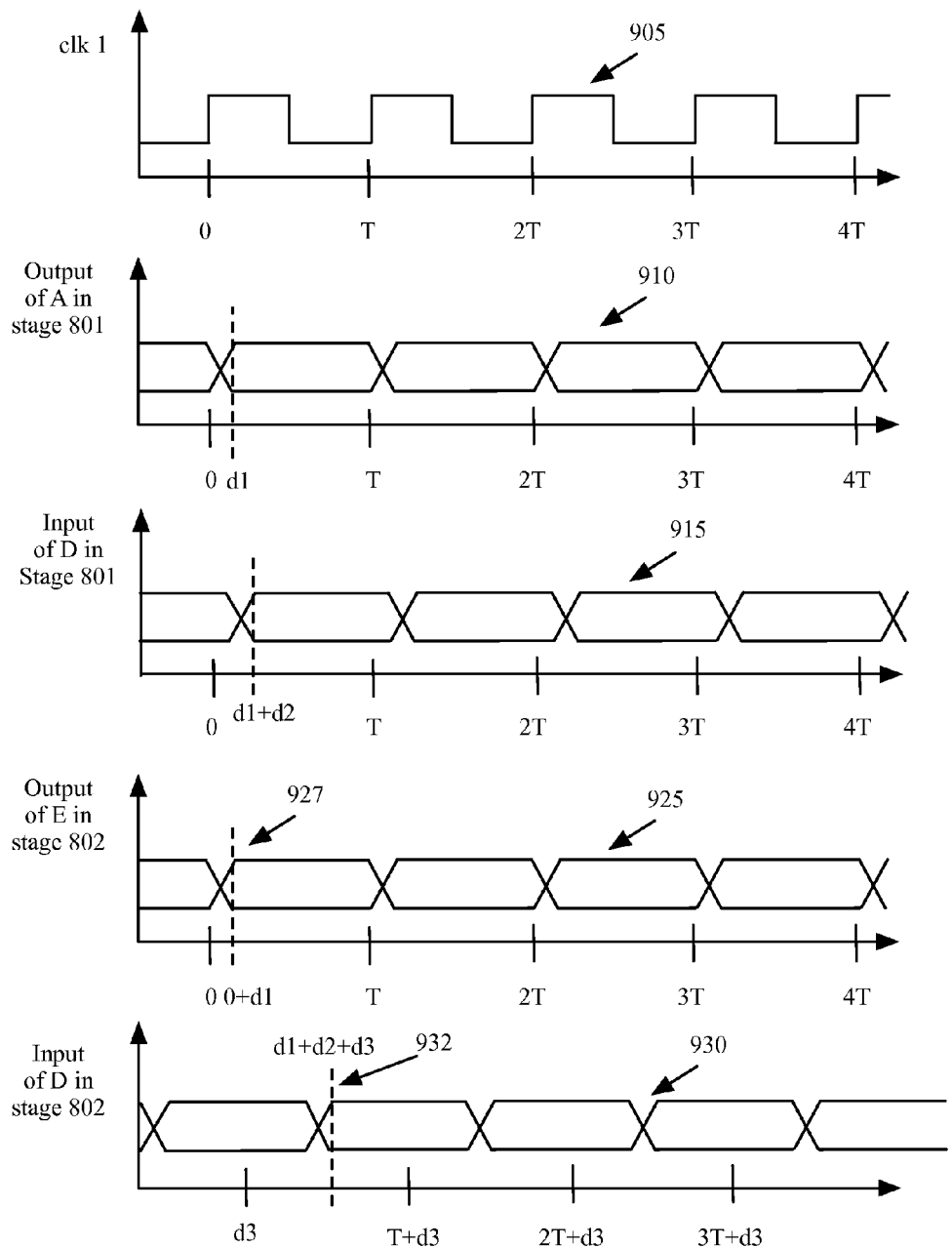
FIG. 9 illustrates a timing diagram for FIG. 8.

FIG. 9 illustrates a timing diagram for FIG. 8. The clock signal 905, the data signal 910 at the output of clocked element 635, and the data signal 915 at the input of combinational logic element 630 are respectively similar to the signals 705, 710, and 715 described above by reference to FIG. 7.

In stage 802, the netlist is retimed by removing the clocked element 635 from the output path of the combinational logic 625 and adding a clocked element 805 in the input path of the combinational logic element 625 (or by moving the clocked element 635 from the output path of the combinational logic 625 to the input path of the combinational logic element 625). The clocked element 805 is placed at a position on the netlist such that the delay for the data signal to travel from the output of clocked element 805 through the wire and combinational logic delays to where the output of clocked element 635 used to be (as shown by arrow 810) is d3. The clock signal for the clocked element 805 is not skewed (e.g., compared to the clock signal of the clocked element 635 prior to clock skew scheduling optimization).

Assuming that the combinational logic element and the clocked elements in FIGS. 6 and 8 are the same, the two netlists in stage 602 in FIG. 6 and stage 802 in FIG. 8 are functionally equivalent. As shown in FIG. 9, since the delay through the clocked element 805 is d1, the data signal 925 at the output of clocked element 805 in stage 802 becomes available at the time d1 (as shown by the dashed line 927) after the further delay of d1. The data signal 930 at the input of combinational logic 630 arrives at time d1+d2+d3 (as shown by the dashed line 932) after a further delay of d3 to go through the wire delays and combinational logic delays from the output of clocked element 805 to the previous output position 810 of clocked element 635 plus the delay of d2 for the data signal to travel through the rest of the wire from position 810 to the input of combinational logic 630. As shown, the data signal receives to the input of combinational logic element 630 at the same time in the clock skew scenario of stage 602 in FIG. 6 and the retiming scenario of stage 802 in FIG. 8.

Figure 10:
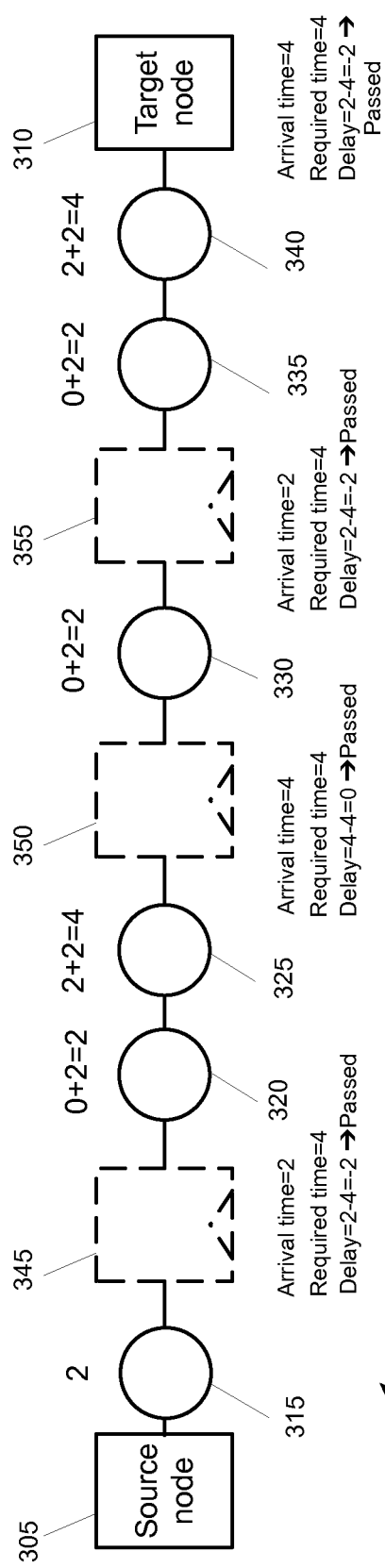
FIG. 10 conceptually illustrates retiming of sequential path shown in FIGS. 2-5 to make the path meet its timing requirements.

FIG. 10 conceptually illustrates retiming of sequential path shown in FIGS. 2-5 to make the path meet its timing requirements. In this example, the timing requirements are met when every path that either (1) starts from a clocked element and ends at a clocked element, (2) starts from a timed element and ends at a clocked element, or (3) starts from a clocked element ends at a timed element, without encompassing any other clocked elements meets its timing requirements (i.e., the arrival time of a signal at a target node is less than or equal to its required time).

As shown in FIG. 10, clocked element 345, which was originally between computational elements 325 and 330 is retimed to be between computational elements 315 and 320. In effect this clocked element is moved to an earlier point in time. As a result, the path between the source node 305 and clocked element 345 will have one computational element. Similarly, clocked element 350 that was originally between computational elements 335 and 340 is moved between computational elements 325 and 330. As a result the path between clocked elements 345 and 350 includes two computational elements. Further, clocked element 355 that was between computational element 340 and the target node 310 is moved between computational elements 330 and 335. As a result, the path between clocked element 355 and the target node 310 includes two computational elements.

The combinational delays for the elements of the four paths (305 to 345, 345 to 350, 350 to 355, and 355 to 310) are computed and the results are displayed on top of each element. These four paths are the paths between two clocked elements or a clocked element and a non-clock timed element. None of the paths encompasses another clocked element other than the source and/or the target nodes.

Combinational delays are compared with required times for the signals to get from source to target nodes in each path. As shown in FIG. 10, when the combinational delay computations are compared with the required times for each target node, the timing requirements for all target nodes (345, 350, 355, and 310) are met (as written under each clocked element and the primary output). Since every path between two clocked elements or between one clocked element and the source or target nodes meets its timing requirement, the overall path 300 also passes the timing requirements (i.e., the path can be performed using the current clock period).

F. Integrated Circuits (ICs)

Some embodiments of the invention optimize the operations of an IC. An IC is a device that includes numerous electronic components (e.g., transistors, resistors, capacitors, diodes, etc.) that are typically embedded on the same substrate, such as a single piece of semiconductor wafer. These components are connected with one or more layers of wiring to form multiple circuits, such as Boolean gates, memory cells, arithmetic units, controllers, decoders, etc. An IC is often packaged as one chip in a single IC package, although some IC packages include multiple pieces of substrate or wafer. Different types of IC in some embodiments of the invention include very large-scale integration (VLSI), ultra-large-scale integration (ULSI), wafer-scale integration (WSI), three-dimensional ICs, system-on-chip (SOC), system-in-package (SIP), application-specific integrated circuit (ASIC), field-programmable gate array (FPGA), programmable logic device (PLD), IC with reconfigurable circuits, etc.

A design layout is a geometric description of the circuit components included in an IC's design. An IC's design layout is often obtained by using a set of computer-based electronic design automation tools (EDAs) to transform a code representation (e.g., a register transfer level (RTL) representation) or circuit representation of the design into a geometric description. The design process entails various operations. Some conceptual representations for some of the various physical-design operations that EDA applications perform to obtain the IC layouts include: (1) circuit partitioning, which partitions a circuit if the circuit is too large for a single chip; (2) floor planning, which finds the alignment and relative orientation of the circuit modules; (3) synthesis, which transforms an RTL or circuit representation to another circuit representation that is mapped to a particular technology of a particular IC; (4) layout, which generates the physical design (or layout) of the IC which includes placement and routing for defining the positions of the circuit modules and the interconnects between the circuit modules; (5) power optimization, which is done to reduce the power consumption of the design; and (6) verification, which checks the layout to ensure that it meets design and functional requirements. It should be apparent to one of ordinary skill in the art that in some embodiments the order in which the various EDA operations are performed need not adhere to the presentation order of the conceptual representations above.

G. Configurable IC Architecture

Some embodiments of the invention optimize the operations of an IC with configurable circuits. A configurable circuit is a circuit that can "configurably" perform a set of operations. Specifically, a configurable circuit receives a configuration data set that specifies the operation that the configurable circuit must perform from the set of operations that it can perform. In some embodiments, configuration data is generated outside of the IC. In these embodiments, a set of software tools typically converts a high-level IC design (e.g., a circuit representation or a hardware description language design) into a set of configuration data bits that can configure the configurable circuits of the IC to implement the IC design.

Examples of configurable circuits include configurable logic circuits and configurable interconnect circuits. A logic circuit is a circuit that can perform a function on a set of input data that it receives. A configurable logic circuit is a logic circuit that can be configured to perform different functions on its input data set.

A configurable interconnect circuit is a circuit that can configurably connect an input set to an output set in a variety of ways. An interconnect circuit can connect two terminals or pass a signal from one terminal to another by establishing an electrical path between the terminals. Alternatively, an interconnect circuit can establish a connection or pass a signal between two terminals by having the value of a signal that appears at one terminal appear at the other terminal. In connecting two terminals or passing a signal between two terminals, an interconnect circuit in some embodiments might invert the signal (i.e., might have the signal appearing at one terminal inverted by the time it appears at the other terminal). In other words, the interconnect circuit of some embodiments implements a logic inversion operation in conjunction to its connection operation. Other embodiments, however, do not build such an inversion operation in any or all of their interconnect circuits.

The configurable interconnect circuit passes signals through a routing fabric of the configurable IC. The routing fabric provides a communication pathway for routing signals to and from source and destination circuits or components. In some embodiments, the routing fabric includes storage elements in addition to the various routing circuits, the wire segments (e.g., the metal or polysilicon segments) that connect to the routing circuits, and vias that connect to these wire segments and to the terminals of the routing circuits. These storage elements include latches and registers distributed across the routing fabric that provide one or more different means for storing signals in the routing fabric.

In some of these embodiments, the routing fabric also includes buffers for achieving one or more objectives (e.g., maintaining the signal strength, reducing noise, altering signal delay, etc.) vis-a-vis the signals passing along the wire segments. In conjunction with, or instead of, these buffer circuits, the routing fabric of some embodiments might also include one or more non-configurable circuits (e.g., non-configurable interconnect circuits).

The IC of some embodiments includes configurable logic circuits and configurable interconnect circuits for routing the signals to and from the configurable logic circuits. An IC with configurable circuits is sometimes referred to a configurable IC. However, in addition to configurable circuits, the IC also typically includes non-configurable circuits (e.g., non-configurable logic circuits, interconnect circuits, memories, etc.).

Figure 11:
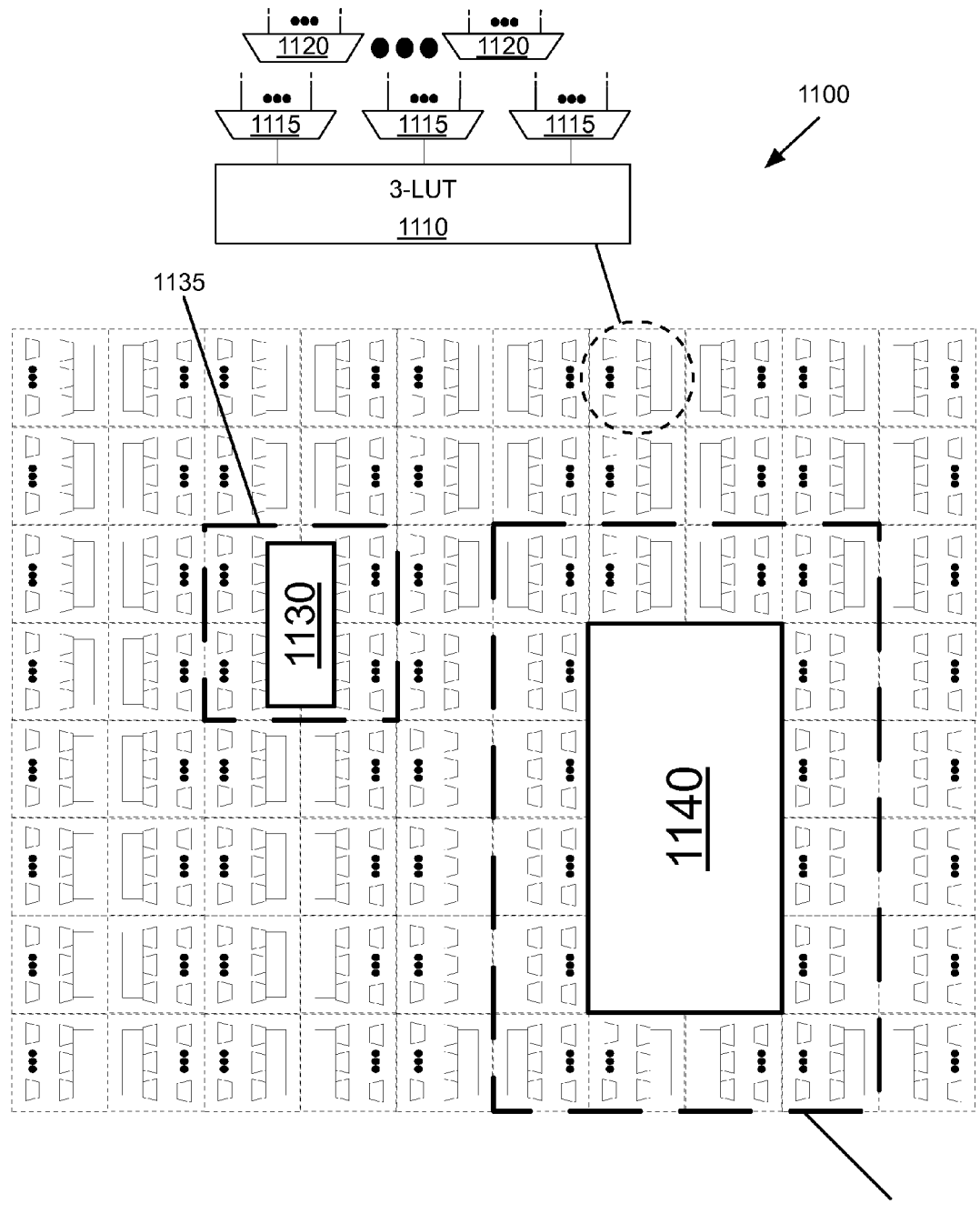
FIG. 11 conceptually illustrates the configurable circuit architecture of some embodiments of the invention.
Figure 12:
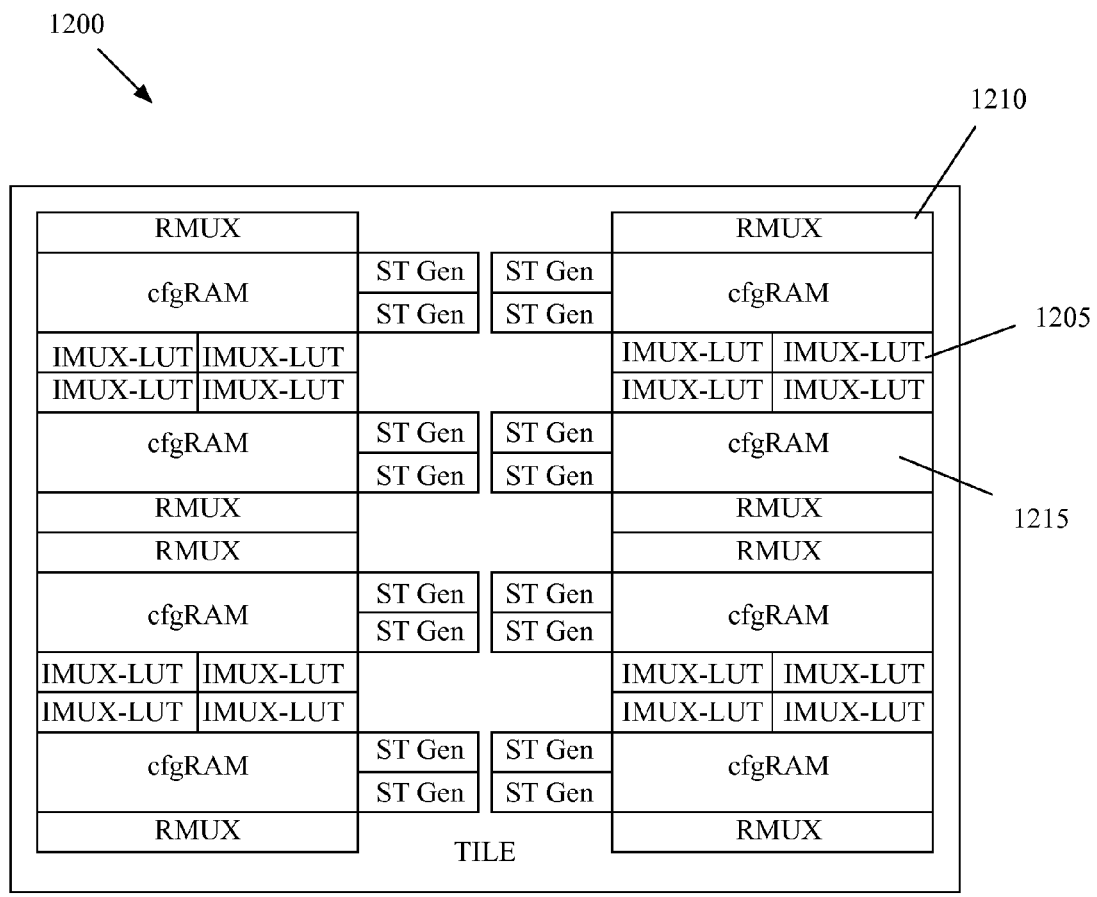
FIG. 12 conceptually illustrates an alternative tile structure that is used in some embodiments.

In some embodiments, the configurable circuits might be organized in an arrangement that has all the circuits organized in an array with several aligned rows and columns. In addition, within such a circuit array, some embodiments disperse other circuits (e.g., memory blocks, processors, macro blocks, IP blocks, controllers, clock management units, etc.). FIGS. 11-12 illustrate several configurable circuit arrangements/architectures in some embodiments of the invention. One such architecture is illustrated in FIG. 11.

FIG. 11 conceptually illustrates the configurable circuit architecture of some embodiments of the invention. As shown in FIG. 11, this architecture is formed by numerous configurable conceptual tiles that are arranged in an array with multiple rows and columns. It should be noted that in some embodiments a "conceptual tile" (or "tile" for short) does not denote any physically distinct object, but is rather a way of referring to groups of circuitry in a repeated or nearly repeated pattern. In such embodiments, the lines around individual tiles represent conceptual boundaries, not physical ones.

In FIG. 11, each configurable tile is a configurable logic tile, which, in this example, includes one configurable three-input logic circuit 1110, three configurable input-select interconnect circuits 1115, and eight configurable routing interconnect circuits 1120. For each configurable circuit, the configurable IC 1100 includes a set of storage elements for storing a set of configuration data. In some embodiments, the logic circuits are look-up tables (LUTs) while the interconnect circuits are multiplexers. In this specification, many embodiments are described as using multiplexers. It will be clear to one of ordinary skill in the art that other embodiments can be implemented with input selection circuits other than multiplexers. Therefore, any use of "multiplexer" in this specification should be taken to also disclose the use of any other type of input selection circuits.

In FIG. 11, an input-select multiplexer ("IMUX") 1115 is an interconnect circuit associated with the LUT 1110 that is in the same tile as the input select multiplexer. One such input select multiplexer (1) receives several input signals for its associated LUT, and (2) based on its configuration, passes one of these input signals to its associated LUT.

In FIG. 11, a routing multiplexer ("RMUX") 1120 is an interconnect circuit that connects other logic and/or interconnect circuits. The interconnect circuits of some embodiments route signals between logic circuits, to and from I/O circuits, and between other interconnect circuits. Unlike an input select multiplexer of some embodiments (which provides its output to only a single logic circuit, i.e., which has a fan-out of only 1), a routing multiplexer of some embodiments is a multiplexer that (1) can provide its output to several logic and/or interconnect circuits (i.e., has a fan-out greater than 1), or (2) can provide its output to other interconnect circuits. The RMUX receives several inputs and based on its configuration, selects the input to pass along the output.

In the architecture illustrated in FIG. 11, each configurable logic tile includes one three-input LUT, three input-select multiplexers, and eight routing multiplexers. Other embodiments, however, might have a different number of LUTs in each tile, different number of inputs for each LUT, different number of input-select multiplexers, and/or different number of routing multiplexers. Other embodiments might also use different types of logic circuits and/or interconnect circuits. Several such architectures are further described in the U.S. Pat. No. 7,295,037, issued on Nov. 13, 2007.

Some of the configurable logic tiles of FIG. 11 together conceptually form configurable memory tiles, which are (1) tiles with blocks of memory, or (2) tiles that are adjacent to blocks of memory. FIG. 11 illustrates two examples of configurable memory tiles. The first example is a memory tile 1135 that is formed by a set of four aligned tiles that have a memory block 1130 in place of their four LUTs. In the second example, a memory tile 1145 is formed by 16 tiles that neighbor a memory block 1140. In the configurable logic tiles of the memory tiles 1135 and 1145, the input select and routing interconnects serve as configurable ports of the memory blocks.

In some embodiments, the examples illustrated in FIG. 11 represent the actual physical architecture of a configurable IC. However, in other embodiments, the examples presented in FIG. 11 topologically illustrate the architecture of a configurable IC (i.e., they show arrangement of tiles, without specifying a particular physical position of the circuits). In some embodiments, the position and orientation of the circuits in the actual physical architecture of a configurable IC is different from the position and orientation of the circuits in the topological architecture of the configurable IC. Accordingly, in these embodiments, the IC's physical architecture appears quite different from its topological architecture.

Some embodiments include user design state ("UDS") elements that store values. At any particular time, the values stored by the UDS elements define the overall user-design state of the circuit structure at that particular time. In some embodiments, a UDS element is capable of continuously outputting the value it stores. Examples of such elements include traditional latches, registers, user flip-flops, and memory structures. U.S. Pat. No. 7,224,181, issued on May 29, 2007; U.S. Pat. No. 7,521,959, Issued on Apr. 21, 2009, and U.S. Pat. No. 8,456,190, issued on Jun. 4, 2013, describe other user-design state elements that include routing multiplexers ("RMUXs") that can serve as storage elements, RMUXs that have storage elements in feedback paths between their outputs and inputs, and storage elements at other locations in the routing fabric (e.g., between RMUXs).

More specifically, some embodiments have RMUXs where at least some of the RMUXs have state elements integrated at the output stage of the RMUX itself. Such RMUXs are referred to as routing circuit latches or RCLs. For instance, some RMUXs use complementary passgate logic ("CPL") to implement a routing multiplexer. Some of these embodiments then implement a routing multiplexer that can act as a latch by placing cross-coupled transistors at the output stage of the routing multiplexer. Such an approach is further described in U.S. Pat. No. 7,342,415, issued on Mar. 11, 2008. In the discussion below, routing multiplexers that can serve as latches are referred to as routing-circuit latches ("RCLs").

In conjunction or instead of such RCLs, other embodiments utilize other storage elements for storing UDS data at other locations in the configurable routing fabric of a configurable IC. For instance, in addition to or instead of having a storage element in the input and/or output stage of an RMUX, some embodiments place a storage element (e.g., latch or register) in a feedback path between the output and input of the RMUX.

Some such UDS elements operate as transparent latches referred to as "time-vias" ("TVs") or clock driven latches referred to as "conduits." When a TV is "open," the TV's output value immediately assumes the TV's current input value. In other words, the TV acts as a wire (with some additional delay). When the TV closes, it captures and holds the current output value (i.e., the output no longer follows the input). TVs are further described below by reference to FIG. 13.

Conduits, unlike TVs, introduce delay when performing a storage operation. In some embodiments, conduits are implemented as single edge-triggered flip-flops. In some embodiments, multiple conduits are chained together to provide longer delays, as necessary.

In some embodiments, some or all of the latches, registers, TVs, or conduits are separate from the RMUXs of the routing fabric and are instead at other locations in the routing fabric (e.g., between the wire segments connecting to the outputs and/or inputs of the RMUXs). For instance, in some embodiments, the routing fabric includes a parallel distributed path for an output of a source routing circuit to a destination circuit. A first path of the parallel distributed path, directly routes the output of the source routing circuit to a first input of the destination circuit. A second path running in parallel with the first path passes the output of the source routing circuit through a UDS element before reaching a second input of the destination circuit. The storage element stores the output value of the routing circuit when enabled. In some embodiments, the second path connects to a different destination component than the first path. When the routing fabric includes buffers, some of these embodiments utilize these buffers as well to build such latches, registers, TVs, or conduits.

Some embodiments might organize the configurable circuits in an arrangement that does not have all the circuits organized in an array with several aligned rows and columns. Therefore, some arrangements may have configurable circuits arranged in one or more arrays, while other arrangements may not have the configurable circuits arranged in an array.

Some embodiments might utilize alternative tile structures. For instance, FIG. 12 illustrates an alternative tile structure that is used in some embodiments. This tile 1200 has four sets 1205 of 4-aligned LUTs along with their associated IMUXs. It also includes eight sets 1210 of RMUXs and eight banks 1215 of configuration RAM storage. Each 4-aligned LUT tile shares one carry chain. One example of which is described in U.S. Pat. No. 7,295,037, entitled "Configurable IC with Routing Circuits with Offset Connections", issued on Nov. 13, 2007. One of ordinary skill in the art would appreciate that other organizations of LUT tiles may also be used in conjunction with the invention and that these organizations might have fewer or additional tiles.

1. Storage Elements at Output of a Routing Circuit

The configurable routing fabric of some embodiments is formed by configurable RMUXs along with the wire-segments that connect to the RMUXs, vias that connect to these wire segments and/or to the RMUXs, and buffers that buffer the signals passing along one or more of the wire segments. In addition to these components, the routing fabric of some embodiments further includes configurable storage elements.

Having the storage elements within the routing fabric is highly advantageous. For instance, such storage elements obviate the need to route data computed by a source component to a second component that stores the computed data before routing the data to a destination component that will use the data. Instead, such computed data can be stored optimally within storage elements located along the existing routing paths between source and destination components, which can be logic and/or interconnect circuits within the IC.

Such storage functionality within the routing fabric is ideal when in some embodiments the destination component is unable to receive or process the signal from the source component during a certain time period. This functionality is also useful in some embodiments when a signal from a source component has insufficient time to traverse the defined route to reach the destination within a single clock cycle or sub-cycle and needs to be temporarily stored along the route before reaching the destination in a later clock cycle (e.g., user-design clock cycle) or in a later sub-cycle in case of a sub-cycle reconfigurable IC. By providing storage within the routing fabric, the source and destination components continue to perform operations (e.g., computational or routing) during the required storage time period.

Figure 13:
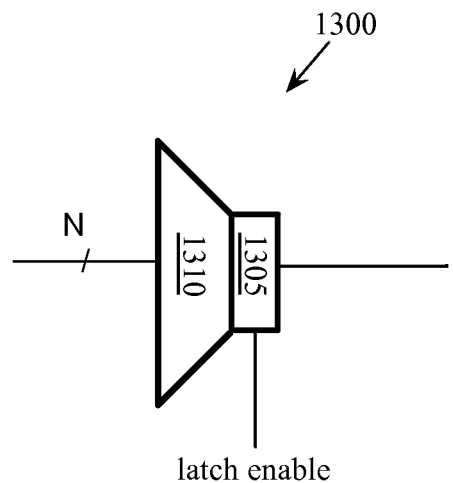
FIG. 13 conceptually illustrates routing circuit with a storage element at its output stage for some embodiments.

FIG. 13 conceptually illustrates routing circuit 1300 with a storage element 1305 at its output stage for some embodiments. The storage element 1305 is a latch that is built in or placed at the output stage of a multiplexer 1310. The latch 1305 receives a latch enable signal. When the latch enable signal is inactive, the circuit 1300 simply acts as a routing circuit. On the other hand, when the latch enable signal is active, the routing circuit 1300 acts as a latch that outputs the value that the circuit was previously outputting while serving as a routing circuit. Accordingly, when another circuit in a second later configuration cycle needs to receive the value of circuit 1300 in a first earlier configuration cycle, the circuit 1300 can be used. The circuit 1300 may receive and latch the value in a cycle before the second later configuration cycle (e.g., in the first earlier cycle) and output the value to the second circuit in the second later sub-cycle.

In some embodiments (e.g., some embodiments that are not runtime reconfigurable), the latch enable signal of FIG. 13 (referred to as latch enable in FIG. 13) is one configuration data bit for all clock cycles. In other embodiments (e.g., some embodiments that are runtime reconfigurable), this enable signal corresponds to multiple configuration data sets, with each set defining the operation of the storage element 1305 during differing clock cycles. These differing clock cycles might be different user design clock cycles, or different sub-cycles of a user design clock cycle or some other clock cycle.

In FIG. 13, the operation of the multiplexer 1310 is controlled by configuration data retrieved from configuration data storage. In some embodiments (e.g., some embodiments that are not runtime reconfigurable), the configuration data for each multiplexer is one configuration data set for all clock cycles. In other embodiments (e.g., some embodiments that are runtime reconfigurable), this configuration data corresponds to multiple configuration data sets, with each set defining the operation of the multiplexer during differing clock cycles, which might be different user design clock cycles, or different sub-cycles of a user design clock cycle or some other clock cycle. U.S. Pat. No. 7,342,415 discloses circuitry for retrieving configuration data sets from configuration data storage in order to control the operation of interconnects and storage elements.

Figure 14:
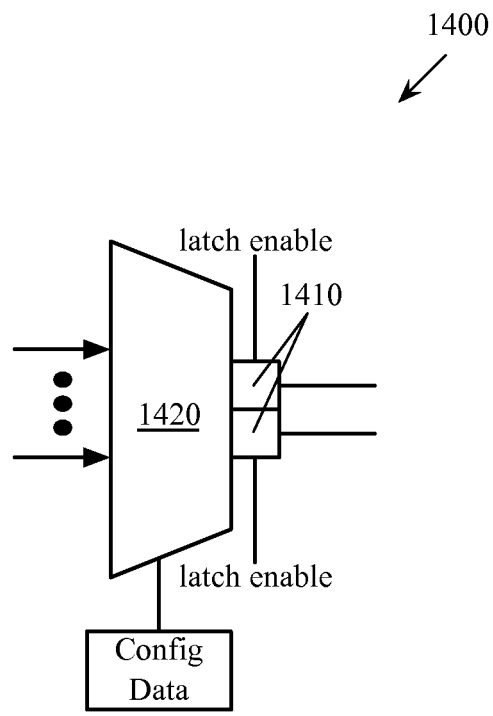
FIG. 14 conceptually illustrates a routing circuit with two storage elements at its output stage for some embodiments.

FIG. 14 conceptually illustrates a routing circuit 1400 with two storage elements at its output stage for some embodiments. The routing circuit 1400 has multiple latches 1410 that are built in or placed at or near the output stage of a multiplexer 1420. The latches 1410 each receive a latch enable signal. When the latch enable signals are inactive, the circuit simply acts as a routing circuit, passing the input signal through both latches. When one latch enable signal is inactive and one latch enable signal is active, the circuit acts as both a routing circuit and a latch that outputs the value that the circuit was previously outputting while serving as a routing circuit. When both latch enable signals are active, the circuit acts as a pair of latches where each outputs the value that the circuit was previously outputting while the latch was serving as a routing circuit. Since each latch enable signal may be activated independently and asynchronously, the storage element 1400 may store a different value in each latch, or store the same value in each latch. In some embodiments, the multiple latch of the routing circuit 1400 provides simultaneous routing and storage capability. The multiple latches or the routing circuit 1400 also allow storing of multiple values in some embodiments.

Accordingly, when other circuits in later configuration cycles need to receive the value (or values) of circuit 1400 in an earlier configuration cycle (or cycles), the circuit 1400 can be used. Alternatively, if no other circuits need to receive the value (or values) of circuit 1400 in an earlier configuration cycle (or cycles), the circuit 1400 can be used to hold the value (or values) at its outputs to prevent bit flicker on the wires or circuits that are connected to the output of the circuit 1400, thus conserving power. The circuit 1400 may receive and latch multiple values in multiple cycles before the later configuration cycle and output multiple values to circuits in the later sub-cycles. One of ordinary skill will recognize that the routing circuit 1400 is not limited to two latches in its output stage. In fact, any number of latches may be placed at the output depending on the needs and constraints of the configurable IC.

In some embodiments, the controls for the multiplexer 1420 and the latches 1410 are derived at least partly from configuration data storage of the IC. In some embodiments, the data in the configuration data storage comes from memory devices of an electronic device on which the IC is a component. In some embodiments (e.g., some embodiments that are not runtime reconfigurable), the configuration data storages store one configuration data set (e.g., one bit or more than one bit) for all clock cycles. In other embodiments (e.g., embodiments that are runtime reconfigurable and have runtime reconfigurable circuits), the configuration data storages store multiple configuration data sets, with each set defining the operations of the circuits 1410 and 1420 during different clock cycles. These different clock cycles might be different user design clock cycles, or different sub-cycles of a user design clock cycle or some other clock cycle. In other words, the circuits 1410 and 1420 can be reconfigured to perform a different operation in every clock cycle of a set (e.g., 3 or more) of consecutive clock cycles.

In some embodiments (e.g., some embodiments that are not runtime reconfigurable), the latch enable signal of FIG. 14 (referred to as Config Data in FIG. 14) is one configuration data bit for all clock cycles. In other embodiments (e.g., some embodiments that are runtime reconfigurable), this enable signal corresponds to multiple configuration data sets, with each set defining the operation of the storage elements during differing clock cycles. These differing clock cycles might be different user design clock cycles, or different sub-cycles of a user design clock cycle or some other clock cycle.

2. Hybrid Storage Elements

As mentioned above, the configurable routing fabric of some embodiments is formed by configurable RMUXs along with the wire-segments that connect to the RMUXs, vias that connect to these wire segments and/or to the RMUXs, and buffers that buffer the signals passing along one or more of the wire segments. In addition to these components, the routing fabric of some embodiments further includes hybrid storage elements that can configurably act either as non-transparent (i.e., clocked) storage elements or transparent configurable storage elements.

Transparent storage elements have the advantage that signals can pass through them at times other than sub-cycle boundaries. Long combinatorial paths with multiple transparent storage elements can be strung together and signals can pass through them within a slow sub-cycle period. In other words, spatial reach is longer for slower frequencies. Transparent storage element also enables time borrowing, meaning that a signal that is passing through a transparent storage element that is going to close in the next sub-cycle can continue to travel past the transparent storage element during the current sub-cycle. Transparent storage elements have the disadvantage that when used as synchronizers, closing and opening them takes two sub-cycles, limiting signal bandwidth. Signals can only pass through every other sub-cycle.

Non-transparent (clocked) storage elements, also called conduits, have the advantage that signals can pass through every sub-cycle. Therefore signal bandwidth is double that of a transparent storage element. Conduits have the disadvantage that they cannot be transparent. Therefore spatial reach does not increase for slower frequencies for a path that includes conduits. No matter how slow the frequency, the signal will stop at the conduit until the next sub-cycle starts. For this same reason, time borrowing does not work with conduits. However, conduits are considered cheaper than transparent storage elements because transparent storage elements need one dynamic configuration memory bit.

Having hybrid storage elements that can be either non-transparent or transparent is highly advantageous. For instance, such storage elements allow data to be stored every clock cycle (or sub-cycle, configuration cycle, reconfiguration cycle, etc.). In addition, such storage elements can be transparent to enable time borrowing as well as traveling longer distances at slower clock rates. These hybrid storage elements may be placed within the routing fabric or elsewhere on the IC.

In much of the discussion above, configurable storage elements that are either transparent or non-transparent were introduced and described. In this section, we introduce and describe hybrid storage elements. A hybrid storage element is one where either a clock signal or a configuration signal directly drives the storage operation. So a hybrid storage circuit necessarily changes either at transitions in the clock or by the state of supplied configuration data. Thus the hybrid storage circuit can behave either in a more arbitrary manner like a configurable storage element or in a more strict manner like a clocked storage circuit.

Figure 15:
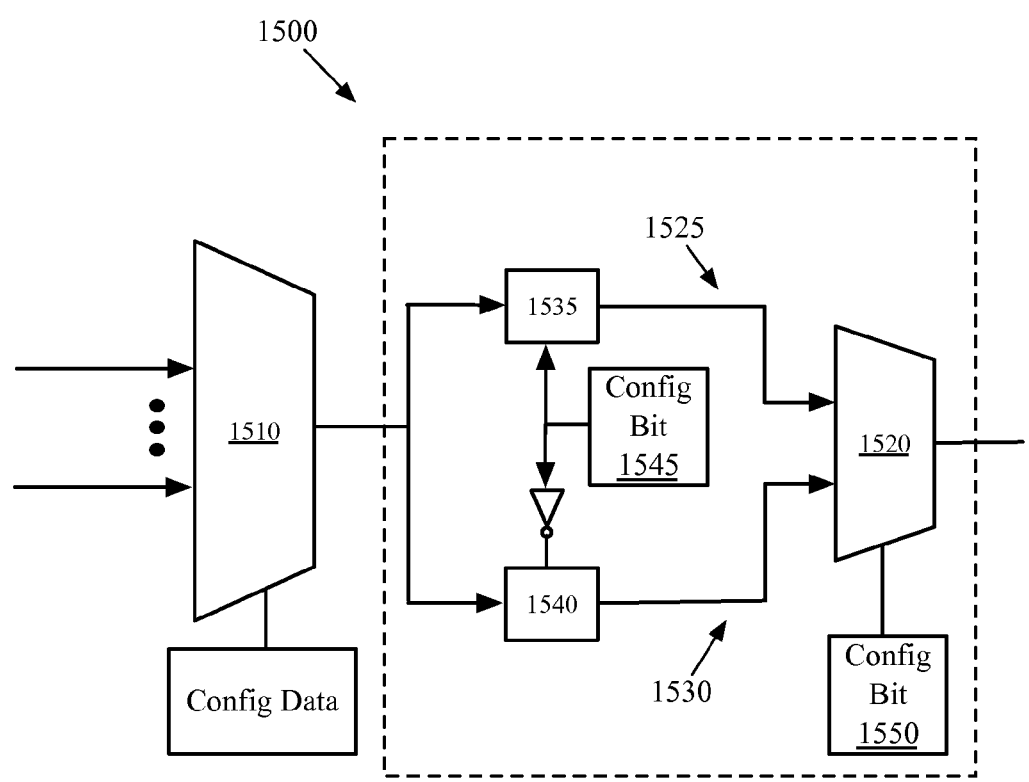
FIG. 15 conceptually illustrates a parallel distributed output path for configurably providing a pair of transparent storage elements.

In different embodiments, hybrid storage elements can be defined at different locations in the routing fabric. FIG. 15 illustrates an example, though one of ordinary skill in the art will realize that it is, of course, not possible to describe every conceivable combination of components or methodologies for different embodiments of the invention.

For some embodiments, FIG. 15 illustrates a parallel distributed output path for configurably providing a pair of transparent storage elements. FIG. 15 illustrates a routing fabric section (or routing circuit) 1500 that performs routing and storage operations by distributing an output signal of a source circuit 1510 through a parallel path to inputs of a sub-cycle reconfigurable output multiplexer 1520. The output multiplexer 1520 in turn feeds one or more destination circuits (not illustrated) in the routing fabric (e.g., RMUX) and/or in the configurable tiles (e.g., LUTs).

The parallel path includes a first path 1525 and a second path 1530. The routing fabric section 1500 is called YMUX in some embodiments. In other words, the reconfigurable transparent storage elements 1535 and 1540, along with their parallel paths and the output multiplexer 1520 are referred to as a YMUX 1500 in some embodiments. In some embodiments, the source circuit 1510 is an RMUX. In some embodiments, RMUXs and YMUXs are paired to form routing resources, such as micro-level fabric.

In some embodiments, the first path 1525 passes the output of the source circuit 1510 through a configurable storage element 1535, where the output may be optionally stored (e.g., when the storage element 1535 is enabled) before reaching a first input of the output multiplexer 1520. In some embodiments, the connection between the source circuit 1510 and the storage element 1535 and the connection between the storage element 1535 and the output multiplexer 1520 are direct connections.

In some embodiments, the second path 1530 runs in parallel with the first path 1525 and passes the output of the source circuit 1510 through a configurable storage element 1540, where the output may be optionally stored (e.g., when the storage element 1540 is enabled) before reaching a second input of the output multiplexer 1520. In some embodiments, the connection between the source circuit 1510 and the storage element 1540 and the connection between the storage element 1540 and the output multiplexer 1520 are direct connections. In some embodiments, one or more of the connections between circuits 1510, 1535, 1540, and 1520 are configurable connections.

The same configuration bit 1545 controls both storage elements 1535 and 1540. The configuration bit 1545 controls storage element 1535 while the inverted version of the configuration bit 1545 controls storage element 1540. As a result, when one of the storage elements 1535 and 1540 is enabled (closed or storing a signal), the other one is disabled (open or passing a signal), and vice versa. A configuration bit 1550 selects either the first path 1525 or the second path 1530 as the output of output multiplexer 1520.

The routing fabric section 1500 can behave like a transparent storage element when the output multiplexer 1520 selects a path with an open storage element as input. This enables time borrowing by allowing signals to travel longer distance at slower clock rates. The routing fabric section 1500 can also behave like a conduit by selecting the input from a closed storage element and switching the configuration bits 1545 and 1550 simultaneously. It acts like a double edge-triggered (DET) flip-flop.

The output multiplexer 1520 is illustrated as a 2:1 multiplexer requiring only one configuration bit. However, in some embodiments, the output multiplexer 1520 receives two or more configuration bits for selecting from among three or more paths.

In some embodiments, the configuration data 1545 and 1550 come at least partly from configuration data storage of the IC. In addition, the controls for the circuit 1510 are also derived at least partly from configuration data storage of the IC. In some embodiments, the data in the configuration data storage comes from memory devices of an electronic device on which the IC is a component. In some embodiments (e.g., some embodiments that are not runtime reconfigurable), the configuration data storages store one configuration data set (e.g., one bit or more than one bit) for all clock cycles. In other embodiments (e.g., embodiments that are runtime reconfigurable and have runtime reconfigurable circuits), the configuration data storages store multiple configuration data sets, with each set defining the operations of the circuits 1510, 1520, 1535, and 1540 during different clock cycles. These different clock cycles might be different user design clock cycles, or different sub-cycles of a user design clock cycle or some other clock cycle. In other words, the circuits 1510, 1520, 1535, and 1540 can be reconfigured to perform a different operation in every clock cycle of a set (e.g., 3 or more) of consecutive clock cycles.

3. Clocked Storage Elements in Parallel Distributed Path

As mentioned above, the configurable routing fabric of some embodiments is formed by configurable RMUXs along with the wire-segments that connect to the RMUXs, vias that connect to these wire segments and/or to the RMUXs, and buffers that buffer the signals passing along one or more of the wire segments. In addition to these components, the routing fabric of some embodiments further includes non-transparent (i.e., clocked) storage elements, also referred to as "conduits." Although the examples shown below are all driven by clock signals, one of ordinary skill in the art will also recognize that the clocked storage elements can also be driven otherwise (e.g., by configuration data, user data, etc.).

Having clocked storage elements is highly advantageous. For instance, such storage elements allow data to be stored every clock cycle (or sub-cycle, configuration cycle, reconfiguration cycle, etc.). In addition, new data may be stored at the input during the same clock cycle that stored data is presented at the output of the storage element. These clocked storage elements may be placed within the routing fabric or elsewhere on the IC.

Figure 16:
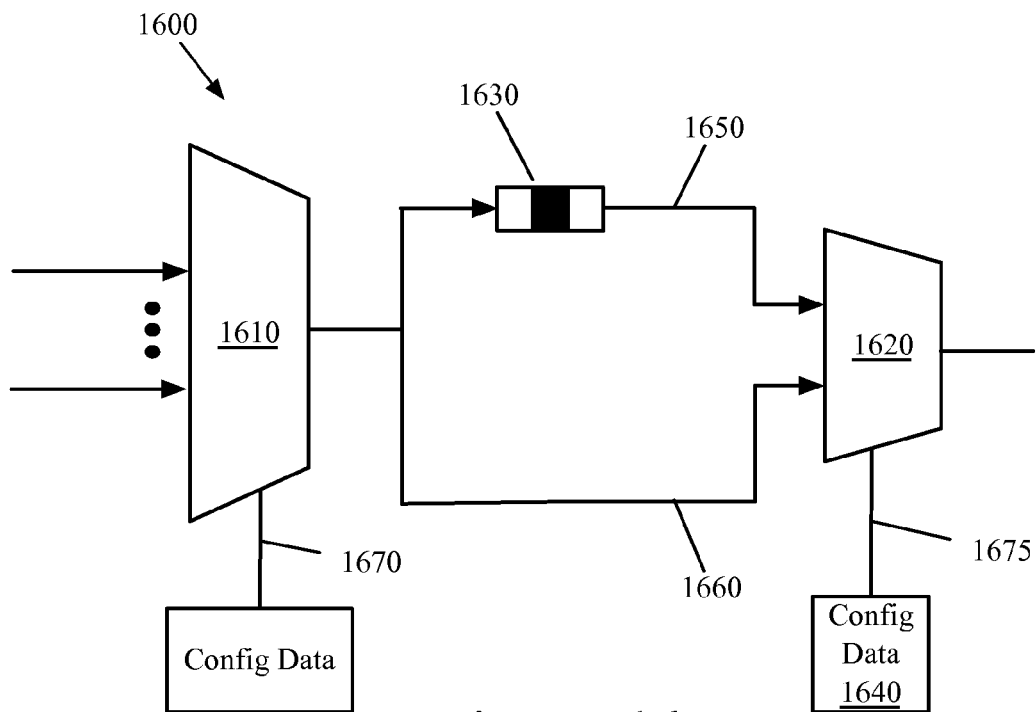
FIG. 16 conceptually illustrates an example routing fabric section (or a routing circuit) for some embodiments that performs routing and storage operations by parallel paths that include a clocked storage element.

In some embodiments, clocked storage elements (i.e., conduits or flip-flops), rather than latches, perform some of the storing operations in the routing fabric. For some of these embodiments, FIG. 16 conceptually illustrates an example routing fabric section (or a routing circuit) 1600 that performs routing and storage operations by parallel paths that include a clocked storage element. The routing fabric section 1600 distributes an output signal of a source circuit 1610 through a parallel path to inputs of a 2:1 output multiplexer 1620. The output multiplexer 1620 in turn feeds one or more destination circuits (not illustrated) in the routing fabric (e.g., RMUX) and/or in the configurable tiles (e.g., LUTs). The parallel path includes a first path 1650 and a second path 1660. The source circuit 1610 can be an input-select circuit for a logic circuit, a routing multiplexer (RMUX), or some other type of circuit.

The first path 1650 passes the output of the source circuit 1610 through a clocked storage element (i.e., conduit) 1630, where the output will be stored every clock cycle (or sub-cycle, configuration cycle, reconfiguration cycle, etc.) before reaching a first input of the output multiplexer 1620. In some embodiments, the connection between the source circuit 1610 and the conduit 1630 and the connection between the conduit 1630 and the output multiplexer 1620 are direct connections.

The second parallel path 1660 runs in parallel with the first path 1650 and passes the output of the source circuit 1610 directly to a second input of the output multiplexer 1620. In some embodiments, the connection between the source circuit 1610 and the output multiplexer 1620 is a direct connection.

A clock signal controls the conduit 1630. A configuration bit 1640 controlling the 2:1 output multiplexer 1620 that selects from either the first path 1650 or the second path 1660 as the output of the routing fabric section 1600. The source circuit 1610 receives its configuration data through a configuration retrieval path 1670. The output multiplexer 1620 receives the configuration bit 1640 through a configuration retrieval path 1675.

The routing fabric section or the routing circuit 1600 is transparent when the second path 1660 (the direct connection path) is selected. This enables time borrowing by allowing signals to travel longer distance at slower clock rates. The routing fabric section 1600 behaves like a conduit when the first parallel path 1650 (the conduit path) is selected. In some embodiments, the parallel paths 1650, 1660 and the output 2:1 multiplexer are jointly referred to as a KMUX in some embodiments.

In some embodiments, the routing fabric section 1600 includes a feedback path (not shown) that sends the output of the output multiplexer 1600 back as one of the inputs of the source circuit 1610 (which can be a routing multiplexer RMUX). By selecting this feedback path after receiving a value from the source circuit 1610, the routing circuit 1600 forms a latch that can be used to hold the received value for multiple sub-cycles. In some embodiments, such a latch formed by the feedback path is also used to prevent bit flickering. In some embodiments, the routing fabric section 1600 does not hold a value for multiple clock cycles or sub-cycles.

The output multiplexer 1620 is illustrated as a 2:1 multiplexer requiring only one configuration bit. However, in some embodiments, the output multiplexer 1620 receives two or more configuration bits for selecting from among three or more paths.

In some embodiments, the configuration data 1640 comes at least partly from configuration data storage of the IC. In addition, the operation of the source circuit 1610 is also controlled by configuration signals derived at least partly from configuration data storage of the IC. In some embodiments, the data in the configuration data storage comes from memory devices of an electronic device on which the IC is a component. In some embodiments (e.g., some embodiments that are not runtime reconfigurable), the configuration data storages store one configuration data set (e.g., one bit or more than one bit) for all clock cycles. In other embodiments (e.g., embodiments that are runtime reconfigurable and have runtime reconfigurable circuits), the configuration data storages store multiple configuration data sets, with each set defining the operations of the circuits 1610 and 1620 during different clock cycles. These different clock cycles might be different user design clock cycles, or different sub-cycles of a user design clock cycle or some other clock cycle. In other words, the circuits 1610 and 1620 can be reconfigured to perform a different operation in every clock cycle of a set (e.g., 3 or more) of consecutive clock cycles.

Figure 17:
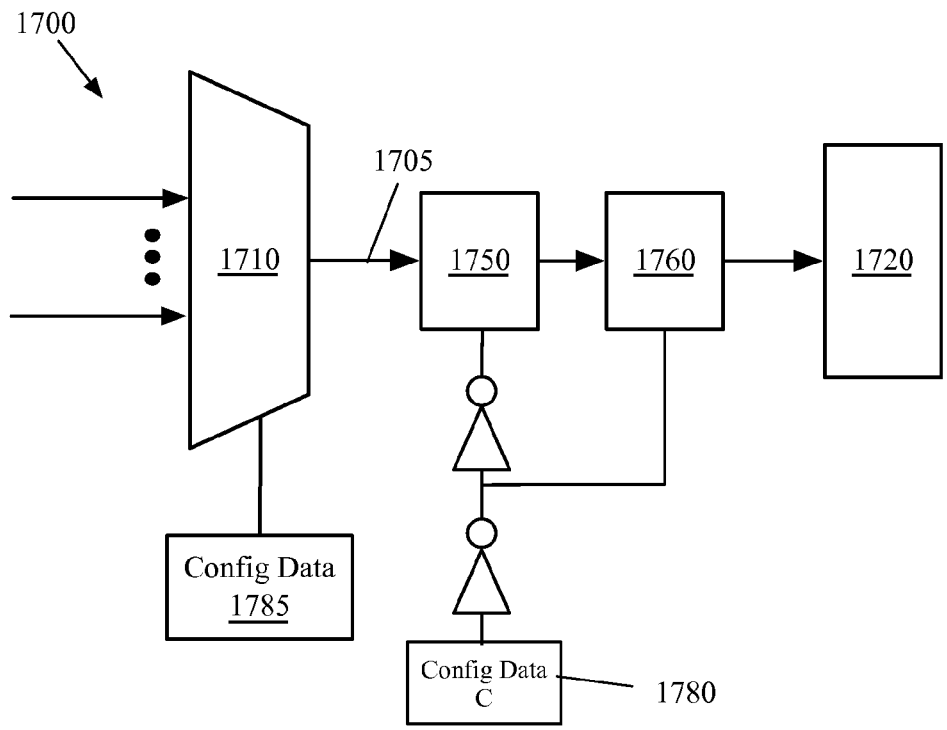
FIG. 17 conceptually illustrates a routing fabric section that includes a pair of configurable master-slave latches and as its clocked storage.

FIG. 17 conceptually illustrates a routing fabric section 1700 that includes a pair of configurable master-slave latches 1750 and 1760 as its clocked storage. The routing fabric section 1700 distributes an output signal of a source circuit 1710 through a path 1705 to a destination circuit 1720. The source circuit 1710 can be an input-select circuit for a logic circuit, a routing multiplexer (RMUX), or some other type of circuit. The path 1705 includes the first (master) latch 1750 and the second (slave) latch 1760. The operations of the latches 1750 and 1760 are controlled by a configuration signal C from configuration data 1780. The source circuit 1710 is controlled configuration signal from a configuration data 1785.

The routing fabric section 1700 performs the same functionality as the routing fabric section 1600 described above by reference to FIG. 16. However, as illustrated in FIG. 17, the configuration signal C has been moved to control the latches 1750 and 1760. When the configuration signal C is set to one value, the latches 1750 and 1760 act as a master-slave flip-flop and are controlled by a clock signal. When the configuration signal C is switched to another value, the output signal of the source circuit 1710 passes transparently through the latches 1750 and 1760. As a result, there is no need to have a separate transparent or bypass wire for the routing fabric section 1700 in order to provide a transparent path from the source circuit 1710 to the destination circuit 1720. In addition, the routing fabric section 1700 does not need a destination multiplexer to select between two output paths, thus removes the delay caused by the multiplexer. In some embodiments, the master-slave latches 1750 and 1760 are jointly referred to as a KMUX.

In some embodiments, the configuration data controlling the source circuit 1710 as well as the latches 1750 and 1760 comes at least partly from a configuration data storage of the IC (such as the configuration data storage 1780 and 1785). In some embodiments, the data in the configuration data storage comes from memory devices of an electronic device on which the IC is a component. In some embodiments (e.g., some embodiments that are not runtime reconfigurable), the configuration data storages store one configuration data set (e.g., one bit or more than one bit) for all clock cycles. In other embodiments (e.g., embodiments that are runtime reconfigurable and have runtime reconfigurable circuits), the configuration data storages store multiple configuration data sets, with each set defining the operations of the circuits 1710, 1750, and 1760 during different clock cycles. These different clock cycles might be different user design clock cycles, or different sub-cycles of a user design clock cycle or some other clock cycle. In other words, the circuits 1710, 1750, and 1760 can be reconfigured to perform a different operation in every clock cycle of a set (e.g., 3 or more) of consecutive clock cycles.

Figure 18:
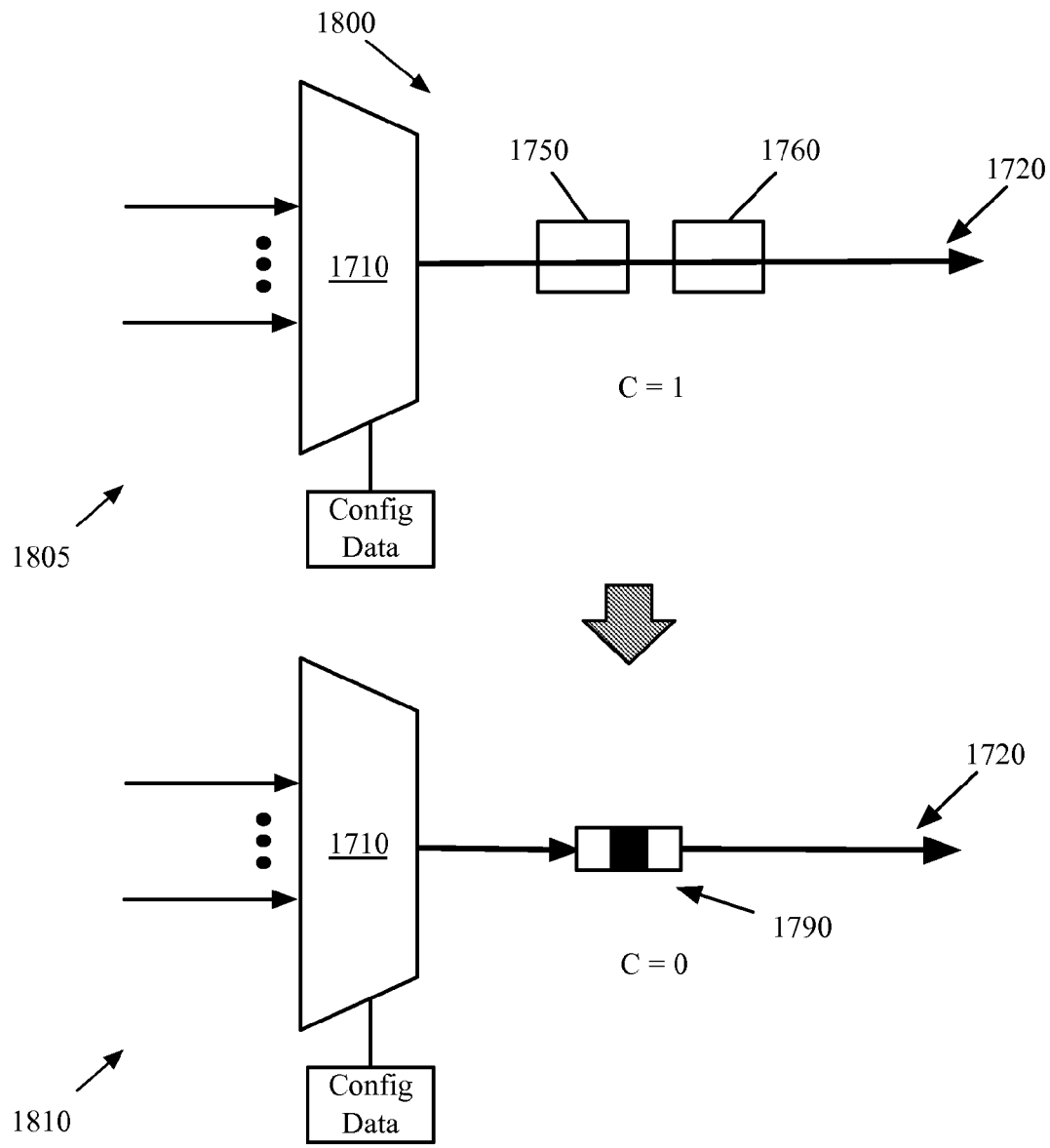
FIG. 18 conceptually illustrates the operations of the circuit based on the value of the configuration signal.

FIG. 18 conceptually illustrates the operations of the circuit 1700 based on the value of the configuration signal C. Specifically, this figure illustrates in two operational stages 1805 and 1810 how different values of configuration signal C affect the behavior of the circuit.

In the first stage 1805, the configuration signal C is high. As a result, the latches 1750 and 1760 pass the output of the source circuit 1710 transparently to the output 1720. In the second stage 1810, the configuration signal C is low. Consequently, the latches 1750 and 1760 act as a master-slave flip flop 1790 (i.e., a conduit). Thus the output of source circuit received at the previous clock cycle is stored in the mater-slave flip flop 1790 and is provided as the output 1720 of the circuit 1800.

The configuration signal C can be used to change the behavior of the circuit based on design needs. If a transparent connection is desirable, the configuration signal C will be set to high. This enables time borrowing by allowing signals to travel longer distance at slower clock rates. If a conduit is desirable, the configuration signal C will be set to low to turn the circuit into a master-slave flip flop. The circuit performs essentially the same functionality as the routing fabric section described above by reference to FIG. 16. However, the circuit 1800 does not include an output multiplexer, thus removing delay caused by the output multiplexer 1620 at the output of the routing fabric section.

The operations of various types of interconnect circuits (e.g., RMUXs) and storage circuits (e.g., conduits and KMUXs) discussed above are determined by configuration data or configuration bits. In some embodiments, the configuration data or configuration bits come at least partly from configuration data storage of the IC. In some embodiments, the data in the configuration data storage comes from memory devices of an electronic device on which the IC is a component. In some embodiments (e.g., some embodiments that are not runtime reconfigurable), the configuration data storages store one configuration data set (e.g., one bit or more than one bit) for all clock cycles. In other embodiments (e.g., embodiments that are runtime reconfigurable and have runtime reconfigurable circuits), the configuration data storages store multiple configuration data sets, with each set defining the operations of the storage elements, source circuits, and output multiplexers during differing clock cycles. These differing clock cycles might be different user design clock cycles, or different sub-cycles of a user design clock cycle or some other clock cycle.

H. Reconfigurable IC Architecture

Some embodiments of the invention perform placement for an IC that has reconfigurable circuits that reconfigure (i.e., base their operation on different sets of configuration data) one or more times during the operation of the IC. Specifically, these ICs are configurable ICs that can reconfigure one or more circuits during runtime. These IC typically includes reconfigurable logic circuits and/or reconfigurable interconnect circuits, where the reconfigurable logic and/or interconnect circuits are configurable logic and/or interconnect circuits that can "reconfigure" more than once at runtime. A configurable logic or interconnect circuit reconfigures when it bases its operation on a different set of configuration data. An IC with reconfigurable circuits is sometimes referred to as a reconfigurable IC. However, in addition to reconfigurable circuits, the IC also typically includes non-configurable circuits (e.g., non-configurable logic circuits, interconnect circuits, memories, configurable circuits that are not sub-cycle reconfigurable, etc.).

In some embodiments, the logic circuits are look-up tables while the interconnect circuits are multiplexers. Also, in some embodiments, the LUTs and the multiplexers are sub-cycle reconfigurable circuits (sub-cycles of reconfigurable circuits may be alternatively referred to as "reconfiguration cycles"). In some of these embodiments, the IC with configurable circuits stores multiple sets of configuration data for a sub-cycle reconfigurable circuit, so that the reconfigurable circuit can use a different set of configuration data in different sub-cycles. A reconfigurable circuit of some embodiments that operates on four sets of configuration data receives its four configuration data sets sequentially in an order that loops from the first configuration data set to the last configuration data set. Such a sequential reconfiguration scheme is referred to as a 4 "loopered" scheme. Other embodiments, however, might be implemented as six, eight, or thirty-two loopered sub-cycle reconfigurable circuits. In a six, eight, or thirty-two loopered reconfigurable circuit, a reconfigurable circuit receives six, eight, or thirty-two configuration data sets respectively in an order that loops from the last configuration data set to the first configuration data set. Sub-cycle reconfigurable circuits are also referred to as spacetime reconfigurable while reconfigurable circuits that are not sub-cycle reconfigurable are referred to as spatial reconfigurable circuits.

Figure 19:
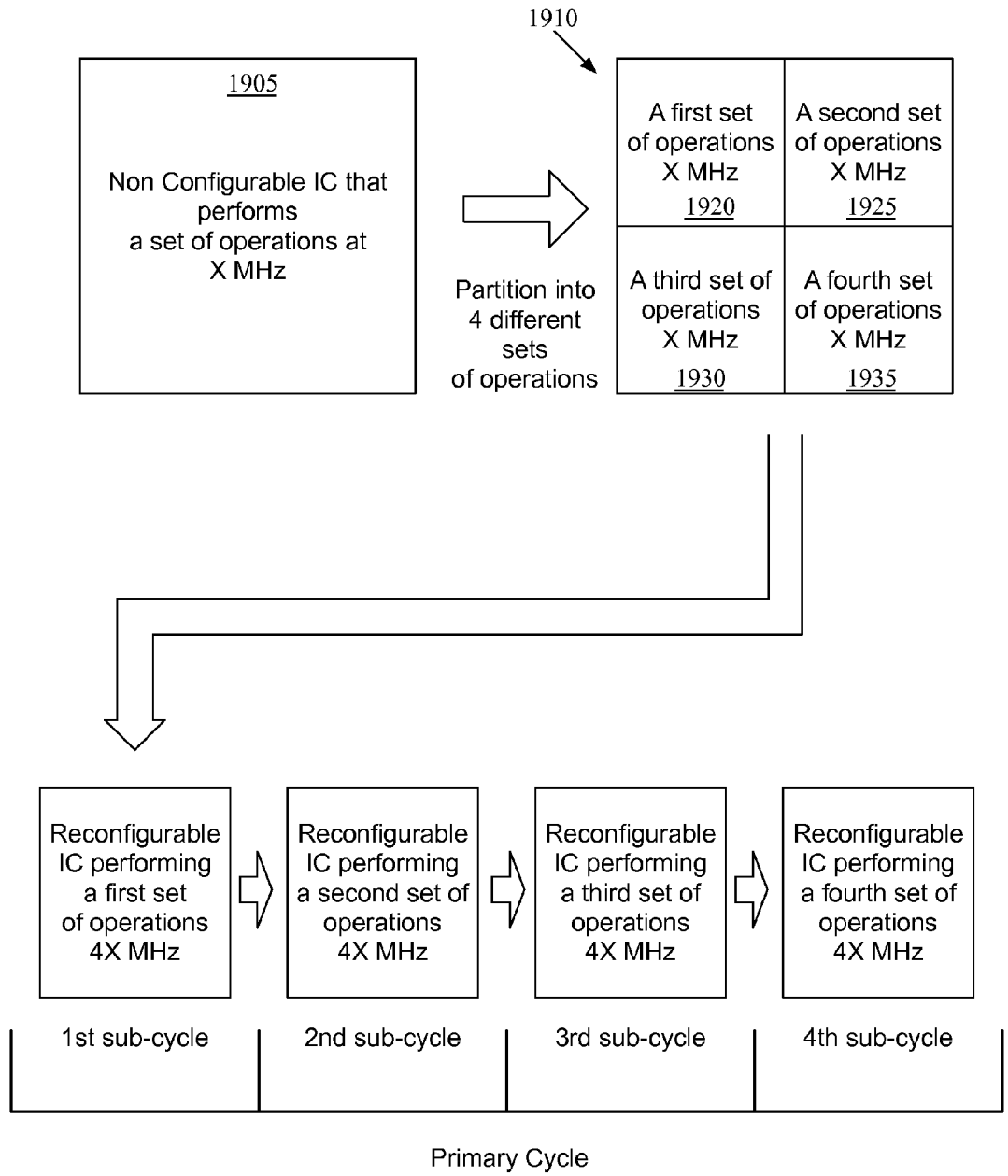
FIG. 19 conceptually illustrates an example of an IC with sub-cycle reconfigurable circuits (i.e., circuits that are reconfigurable on a sub-cycle basis).

FIG. 19 conceptually illustrates an example of an IC with sub-cycle reconfigurable circuits (i.e., circuits that are reconfigurable on a sub-cycle basis). In this example, the IC implements an IC design 1905 that operates at a clock speed of X MHz. The operations performed by the components in the IC design 1905 can be partitioned into four sets of operations 1920-1935, with each set of operations being performed at a clock speed of X MHz.

FIG. 19 then illustrates that these four sets of operations 1920-1935 can be performed by one IC 1910 with sub-cycle reconfigurable circuits. The IC operates at 4X MHz. In some embodiments, four cycles of the 4X MHz clock correspond to four sub-cycles within a cycle of the X MHz clock. Accordingly, this figure illustrates the IC 1910 (i.e., at least one or the reconfigurable circuits of the IC) reconfiguring four times during four cycles of the 4X MHz clock (i.e., during four sub-cycles of the X MHz clock). During each of these reconfigurations (i.e., during each sub-cycle), the IC 1910 performs one of the identified four sets of operations 1920-1935. In other words, the faster operational speed of the IC 1910 allows the circuits of this IC to reconfigure four times during each cycle of the X MHz clock, in order to perform the four sets of operations 1920-1935 sequentially at a 4X MHz rate instead of performing the four sets of operations in parallel at an X MHz rate.

Several embodiments were described above by reference to examples of sub-cycle reconfigurable circuits that operate based on four different sets of configuration data. In some of these examples, a reconfigurable circuit receives its four different configuration data sets sequentially in an order that loops from the last configuration data set to the first configuration data set. Such a sequential reconfiguration scheme is referred to as a 4-loopered scheme. Higher order loopered schemes (e.g., 8, 16, 32, etc.,) are likewise implemented in some embodiments.

While the reconfigurable circuits described above reconfigure in sub-cycles of a user design clock cycle, one of ordinary skill in the art will understand that in some embodiments, the reconfiguration cycles are not part of a larger user design clock cycle. Accordingly, any features described herein as using sub-cycles can also be implemented in some embodiments with reconfiguration cycles that are not sub-cycles of a longer user design clock cycle. In some such embodiments, multiple reconfigurations of the reconfigurable circuits are performed cyclically based on a reconfiguration clock cycle. In some such embodiments, some reconfigurable circuits reconfigure sequentially through a sequence of configurations over the course of multiple reconfiguration cycles, and then repeat the sequence of configurations multiple times.

II. IMPLEMENTING AN IC DESIGN BY RETIMING AND PRESENTING SIMULATION RESULTS AS CLOCK SKEW SCHEDULING

Figure 20:
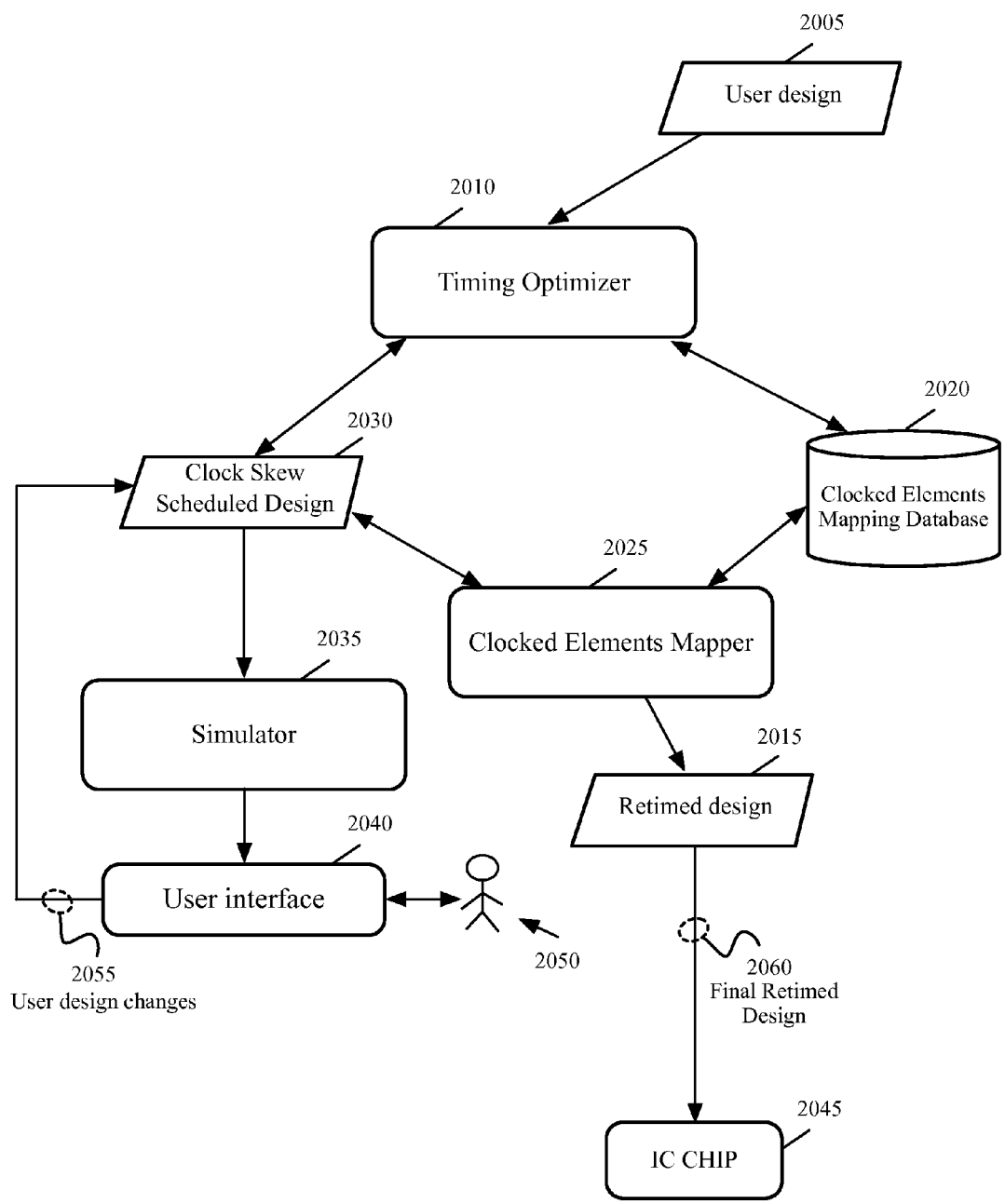
FIG. 20 conceptually illustrates a system for performing timing optimization in some embodiments of the invention.

Some embodiments provide a method for implementing an IC design by using retiming while reporting the simulation results to the IC designer using the topology of the original user design. FIG. 20 conceptually illustrates a system for performing timing optimization in some embodiments of the invention. FIG. 20 is described by referring to FIGS. 21 and 22. As shown in FIG. 20, the timing optimizer 2010 receives an IC user design 2005. The user design 2005 is, for example, written as design abstractions in a language such as register transfer language (RTL).

The timing optimizer 2010 optimizes the user design 2005 by changing the clock arrival times on different clocked elements such as registers and latches in order to borrow from paths with larger slacks to improve the timing of more critical paths. The timing optimizer in some embodiments is utilized after the completion of one or more stages of design flow such as synthesis, placement, or routing. The timing optimizer 2010 saves the clock skew scheduled design 2030. The timing optimizer 2010 also saves the location of the clocked elements and the amount of change in the corresponding clock arrival times in the clocked elements mapping database 2020.

Figure 21:
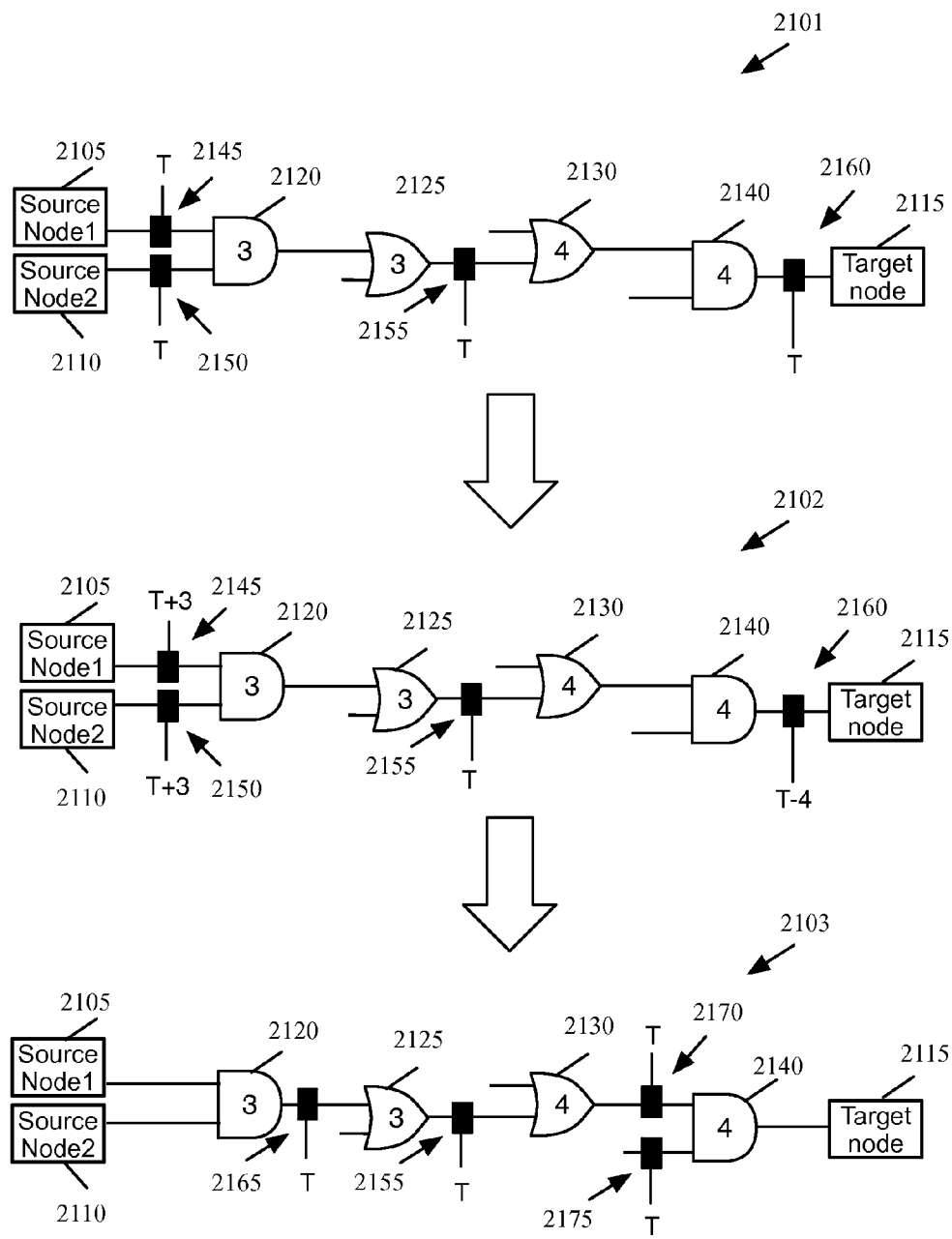
FIG. 21 conceptually illustrates different optimization stages of a portion of a netlist in some embodiments of the invention.

FIG. 21 conceptually illustrates different optimization stages of a portion of a netlist in some embodiments of the invention. The figure is shown in three stages 2101-2103. Stage 2101 shows the portion of the netlist as specified in the user design prior to timing optimization. The portion of the netlist includes four combinational logic elements 2120-2140 and four clocked elements 2145-2160.

The time required to perform each combinational logic element is shown inside the logic element as a unit of time. For simplicity, it is assumed that there are no delays attributed to wiring lengths in this example. Alternatively, the delays attributed to wiring lengths can be added to the computation time of the combinational logic elements.

Also, the clock signals for clocked elements 2145, 2150 2155, and 2160 are specified to arrive at a periodic time interval, T, without any skew. Since combinational logic elements 2120 and 2125 require a total of 6 time units and combinational logic elements 2130 and 2140 require a total of 8 time units, the clock for the original user design has to be at least 8 time units in order to meet the timing requirement for this portion of the netlist. The total delay for the path from source nodes 2105 and 2110 to target node 2115 is 2*8=16 time units. Therefore, if the design constraints require the delay through the path to be less than 16 time units, the timing for the path fails.

As shown, in stage 2102, the clock arrival time for clocked elements 2145 and 2150 is skewed by 3 time units, the clock arrival time of clocked element 2155 is not changed, and the clock arrival time for clocked element 2160 is skewed by −4 time units.

Figure 22:
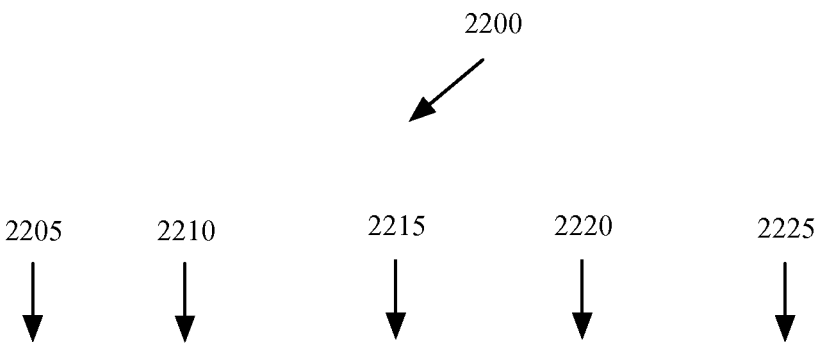
FIG. 22 conceptually illustrates an example of the information stored in the clocked elements mapping database in some embodiments of the invention.

FIG. 22 conceptually illustrates an example of the information stored in a table 2200 in the clocked elements mapping database in some embodiments of the invention. As shown, column 2205 shows the identification of the clocked elements in the original user design. Column 2210 shows the original location of each clocked element in the netlist (or in the IC layout). Column 2215 shows the amount of clock skews (as either a positive or negative numbers).

Referring back to FIG. 20, once the optimization is done, the optimized design is used by the simulator 2035, which performs simulation and presents the results to the user as clock skew scheduling on the same netlist topology that was provided in the original user design 2005.

The user 2050 reviews the simulation results using a user interface 2040. The user provides changes to the user design based on the simulation results by using a set of tools provided as a part of the user interface 2040. For instance, the user provides changes to the user design (e.g., by moving the clocked elements or changing the combinational logic) to further optimize the design. The user design changes 2035 are reflected in the clock skew scheduled design 2030. Changes made by the user to clocked elements of the clock skew scheduled design 2030 are also reflected in the clocked elements mapping database 2020. For instance, in some embodiments, the user interface 2040 includes a tool that updates the clocked elements mapping database 2020 as the user makes changes to the clocked elements. In other embodiments, changes the user makes to the clocked elements are passed to the timing optimizer 2010, which in turn updates the clocked elements mapping database 2020.

Once the user approves the simulation results, the clocked elements mapper 2025 uses the clock skew scheduled design and the clocked elements mapping database to generate a retimed design 2015. Retiming of the design includes moving the clocked elements from their positions in the netlist with respect to combinational logic elements such that the clock for the retimed clocked element in the retimed design 2015 arrives at the same time as the clock signal arrives to the clocked element in the clock skew scheduled design 2030. For instance, one or more of the clocked elements are moved form the input paths of the combinational logic elements to the output path of these combinational elements or vice versa.

Stage 2103 in FIG. 21 shows the retimed netlist. As shown, clocked elements 2145 and 2150 on the input path of combinational logic element 2120 are replaced by the clocked element 2165 on the output path of the combinational logic element 2120, clocked element 2155 is not replaced, and clocked element 2160 on the output path of combinational logic element 2140 is replaced by clocked elements 2170 and 2175 on the input paths of the combinational logic element 2140. In this example, the clock arrival time of all clock elements in this portion of the netlist are set back to arrive at the same time with no skew. As shown, the longest path between two clocked elements in this portion of the netlist after retiming is 4 units of time and therefore the clock period has to be at least four unit of times to meet the timing requirements for this portion of the netlist. Also, in FIG. 22, column 2220 shows the identification of the retimed clocked element and column 2225 shows the corresponding locations in the netlist.

The retimed design 2015 is used to build the IC chip 2045. For instance, when the IC is an ASIC, the retimed design is used to build the IC hardware and when the IC is an IC with configurable or reconfigurable circuits, the retimed design is used to configure the IC circuits.

Figure 23:
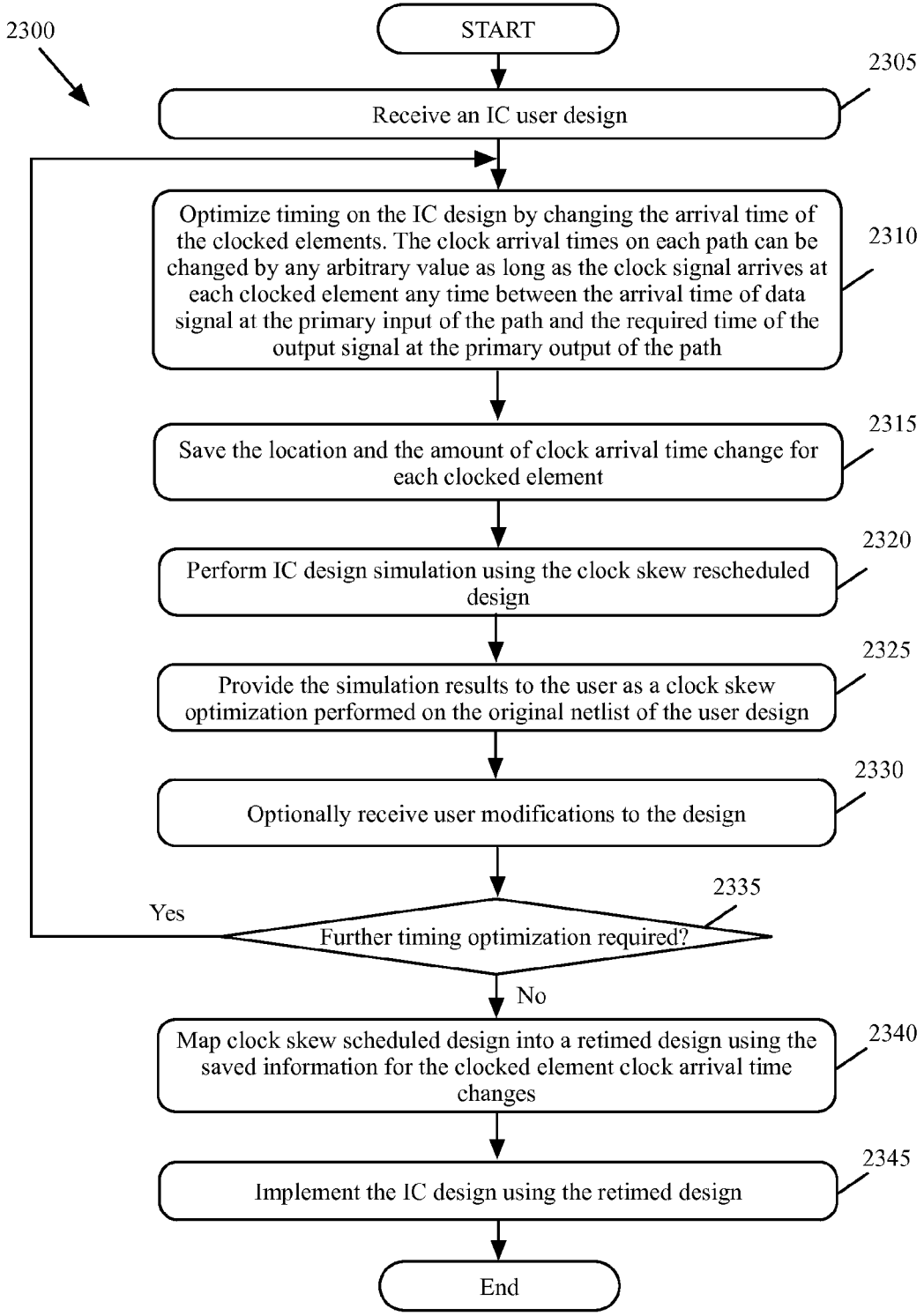
FIG. 23 conceptually illustrates a process that utilizes retiming to implement an IC design but presents the design simulations to the users as clock skew scheduling.

FIG. 23 conceptually illustrates a process 2300 that utilizes retiming to implement an IC design but presents the design simulations to the users as clock skew scheduling. As shown, the process receives (at 2305) the IC user design.

The process then optimizes (at 2310) timing of the IC design by changing the clock arrival time of retimed clocked elements without moving clocked elements in the netlist from the input path of a combinational logic element to the output path of the combinational logic element or vice versa. The clock arrival times on each path can be changed by any arbitrary value as long as the clock signal arrives at each clocked element any time between the arrival time of data signal at the primary input of the path and the required time of the output signal at the primary output of the path.

This is in contrast with the prior art clock skew scheduling techniques in which the amount of the clock skew cannot exceed one clock period and has to satisfy constraints defined by expressions (B) and (C) above. In other words, process 2300 skews the clocked elements clocks by amounts that makes it impossible to implement the IC design without moving the position of the clocked elements from the input (or output) paths of combinational logic elements to their output (or input) paths. The disclosed invention allows skewing the clocks by any arbitrary values within the time that is allocated to a sequential path because, as described herein, only the optimization and simulation are performed by using clock skews. In addition, the disclosed embodiments not only allow moving the clocked elements by more than one clock period, but also allow skew scheduling where the period of time between adjacent clocked elements in a combinational sub-path of a sequential path is greater then once clock period. For instance, one clocked element can be skewed backward by ⅔ of a clock cycle and the next clocked element in the path forwards by ⅔ of a clock cycle. Once the results are presented to the user as clock skew scheduling and the clock skew optimized IC design is accepted, the IC is actually implemented by retiming and moving the clocked elements along the sequential paths to provide the same functionality (as described by reference to FIGS. 6-9, above) as the clock skew optimized IC design.

The process also saves (at 2315) the location and the amount of clock arrival time change of each clocked element to use for retiming of the IC design. The process then performs (at 2320) IC design simulation by presents the results as a clock skew scheduled design.

The process then provides (at 2325) the simulation results to the user as clock skew optimization performed on the original netlist of the user design. The process provides the simulation results by specifying (i) the arrival time of data and clock signals at the inputs of the clocked and computational logic elements and (ii) the available time of the data signals at the output of the clocked elements and computational logic elements. The relative position of the clocked elements and the computational logic elements in the netlist of the IC user design is maintained in the simulation results. As described further below, when there are any timing failures, the simulation results identify the paths that are the actual cause for the timing failure.

The process then optionally receives (at 2330) user modifications to the design. As described in further detail in the following sections, when the optimization performed in operation 2310 cannot meet the timing requirements, the user is provided with specific information to identify the path that is the cause of the timing failure.

The process then determines (at 2335) whether further timing optimization is required. If yes, the process proceeds to 2310, which was described above. Otherwise, the process maps (at 2340) the clock skew scheduled design into a retimed design, e.g., by using the saved information about the changes made to the clock arrival times of the clocked elements. The process then implements (at 2345) the IC design by using the retimed design. The process then ends.

III. REPLACING EDGE-TRIGGERED CLOCKED ELEMENTS WITH LEVEL-SENSITIVE CLOCKED ELEMENTS TO IMPROVE THE PERFORMANCE OF AN IC

In order to achieve an ideal retiming scenario for a netlist path, a clocked element needs to be able to be retimed by any arbitrary value with any arbitrary precision. However, when the clocked element is edge triggered, there is a granularity for retiming of the amount of delay in the combinational nodes in the path. The factors that have to be considered include the fact that retiming places the clocked element in a new location on the path (i.e., a fixed quanta of delay is moved from one side of the clocked element to the other), the amount of delay of the element that the clocked element is moved over, and the fact that the edge-triggered clocked element has a clock that occurs at a fixed time interval.

Figure 24:
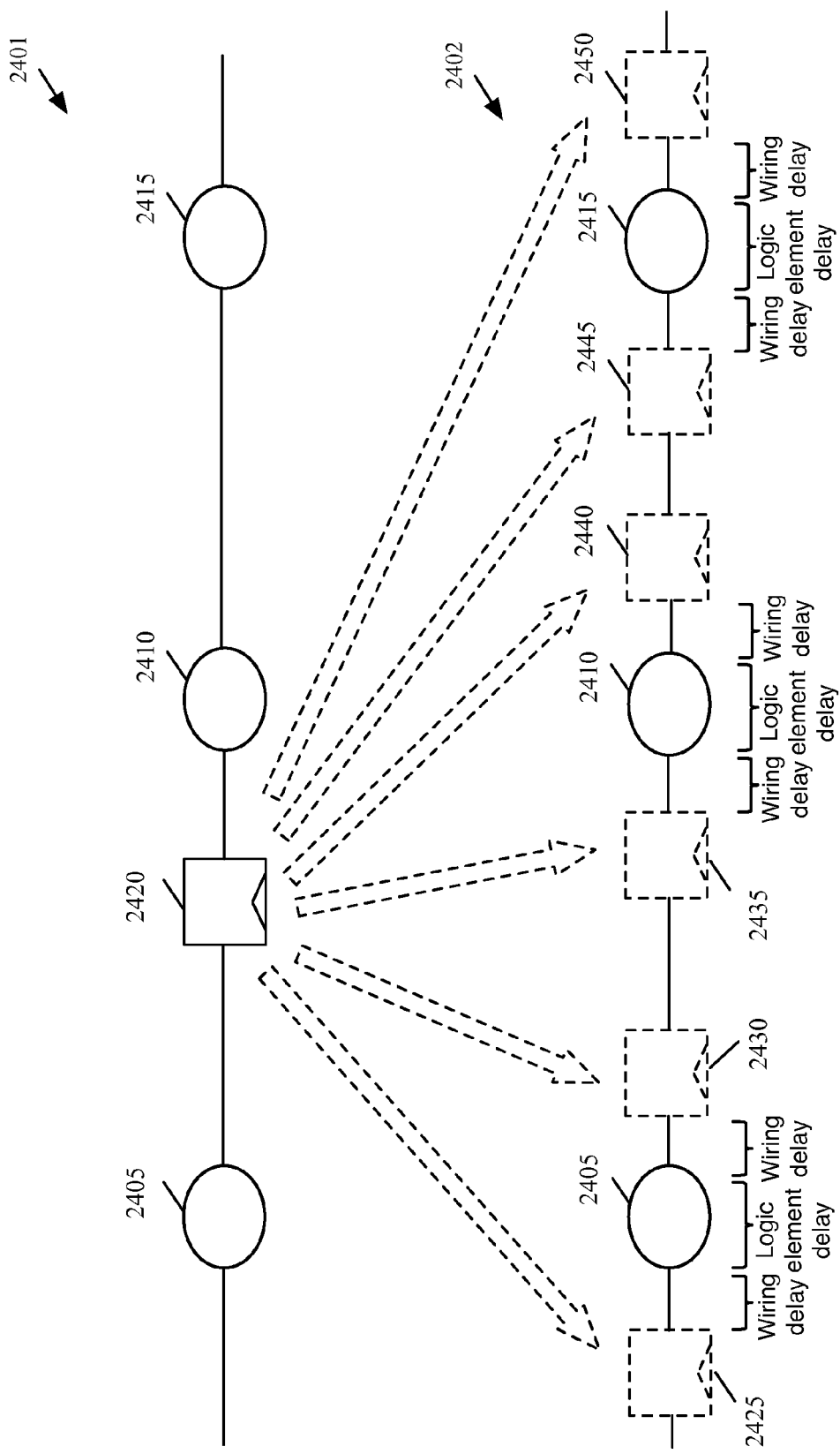
FIG. 24 conceptually illustrates optimization of a portion of a netlist that utilizes edge-triggered clocked elements in some embodiments of the invention.

FIG. 24 conceptually illustrates optimization of a portion of a netlist that utilizes edge-triggered clocked elements in some embodiments of the invention. The figure is shown in two stages 2401 and 2402. As shown in stage 2401, the netlist includes a clocked element 2420 and several combinational logic elements 2405-2415. The clocked element in this example is an edge-triggered clocked element such as a flip-flop or register that changes its output only on either of the rising edge or falling edge of the clock signal.

Stage 2402 illustrates several possibilities 2425-2450 for moving the clocked element 2420 in the netlist. As shown, clocked element can be moved to the input or output path of any of the combinational logic element as long as the edge of the clock satisfies the following limitations. When the clocked element is in the input path of a combinational logic element, the triggering edge of the clock for the clocked element has to occur early enough (i) to allow the output of the clocked element to travel the wire length (or the routing fabric) to reach the input of the combinational logic element and (ii) to allow the combinational logic element to produce its output by the required time of the output of the combinational logic element.

Similarly, when the clocked element is in the output path of a combinational logic element, the edge of the clock for the clocked element has to occur late enough (i) to allow the combinational logic element to produce its output and (ii) to allow output of the combinational logic element to travel the wire length (or the routing fabric) to reach the input of the clocked element.

These limitations are conceptually shown in stage 2402 of FIG. 24. For instance, the clocked element can be retimed and placed anywhere between 2430 and 2435 or between 2440 and 2445 but cannot be placed closer to combinational logic element 2405 than 2425 or 2430 or closer to combinational logic element 2410 than 2435 or 2440.

There is therefore a granularity for placing the edge of the clock for the edge-triggered clock elements. As an example, in an FPGA that uses 6-LUTs to implement combinational logic elements, the delay is typically around 500 ps (picoseconds).

One technique to implement clock skew scheduling is to configure some of clocked elements to trigger on the opposite edge of the clock. For instance, when several consecutive clocked elements in a path trigger on the rising edge of the clock, configuring one of the clocked elements to trigger on the falling edge of the clock acts similar to skewing of the clock. The triggering event occurs half a cycle earlier (or later) than other clocked elements. This technique provides the granularity of half a clock cycle.

Another technique to implement clock skew scheduling is to utilize different clock signals with the same frequency and different phase shifts. The smallest granularity between the phase-skewed clocks is the granularity with which the clock skew scheduling can be implemented. This technique requires access to selectable clock skewing, several clock signals, or clocks with configurable delay lines. Using an n phase clock provides granularity of 1/n clock cycles.

Figure 25:
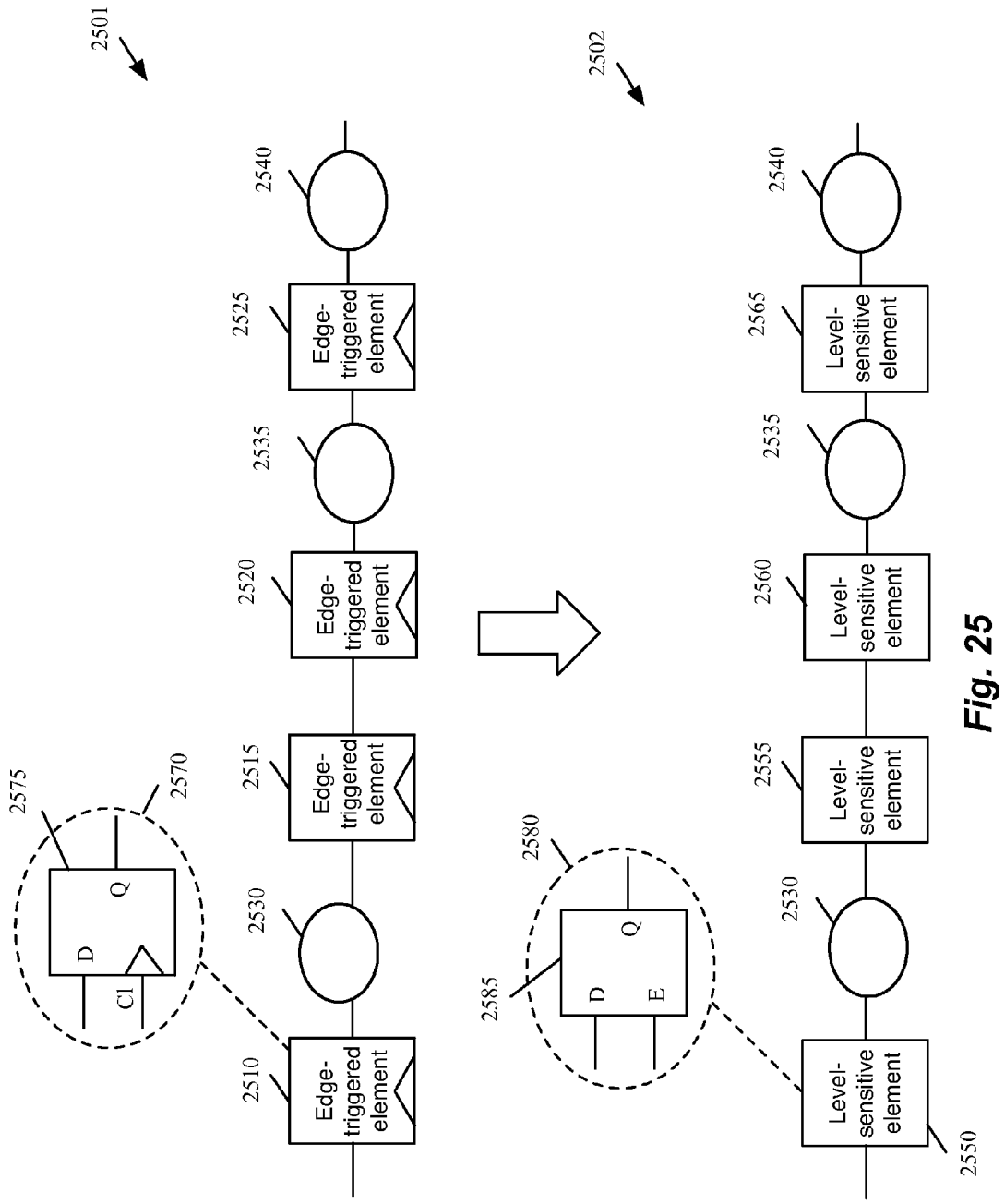
FIG. 25 conceptually illustrates a portion of a netlist where edge-triggered clocked elements are replaced with level-sensitive clocked elements.

Some embodiments provide a method for improving the granularity in clock skews. These embodiments, replace edge-triggered (or edge-sensitive) clocked element such as registers and flip-flops with level-sensitive (or level-triggered) clocked elements such as latches. FIG. 25 conceptually illustrates a portion of a netlist where edge-triggered clocked elements are replaced with level-sensitive clocked elements. The figure is shown in two stages 2501 and 2502. In stage 2501, the netlist includes several clocked elements 2510-2525 and several combinational logic elements 2530-2540.

As shown in the expanded view 2570, each clocked element is an edge-triggered clocked element such as a D flip-flop 2575. The flip-flop can be triggered by the rising edge or by the falling edge of the clock. The D flip-flop stores the data on D input and passes the input to the output Q on the clock transition. For instance, for a flip-flop that is triggered by the positive edge of the clock, the output Q receives the input S only on the positive going edge of the clock.

In stage 2502, the edge-triggered clocked elements 2510-2525 are replaced by level-sensitive clocked elements 2550-2565. As shown in the expanded view 2580, each clocked element is a level-sensitive clocked element such as a D latch 2585. The D latch captures (or latches) the logic level which is present on the D input when the clock input is high. If the data on the D input changes state while the clock pulse is high, then the output, Q, follows the input. When the clock input is low, the last state of the D input is trapped and held on the latch output. Alternatively, a D latch can capture the input signal when the clock signal is low and hold the output when the clock signal is high.

For the edge-triggered clocked elements in stage 2501, if the data signal arrives early, it has to wait for the clock signal in order to pass to the output of the clocked element. The waiting time is, therefore, wasted. On the other hand, if the data signal gets to the level-sensitive clocked elements in stage 2502 any time during the half cycle period during which the clocked element passes the data from the input to the output, the data is passed to the output without any waiting time. Using the level-sensitive clocked devices, therefore, provides perfect granularity within the window that the clocked element is open. Data signals for the level-sensitive devices do not need to be available right on the clock edge.

Figure 26:
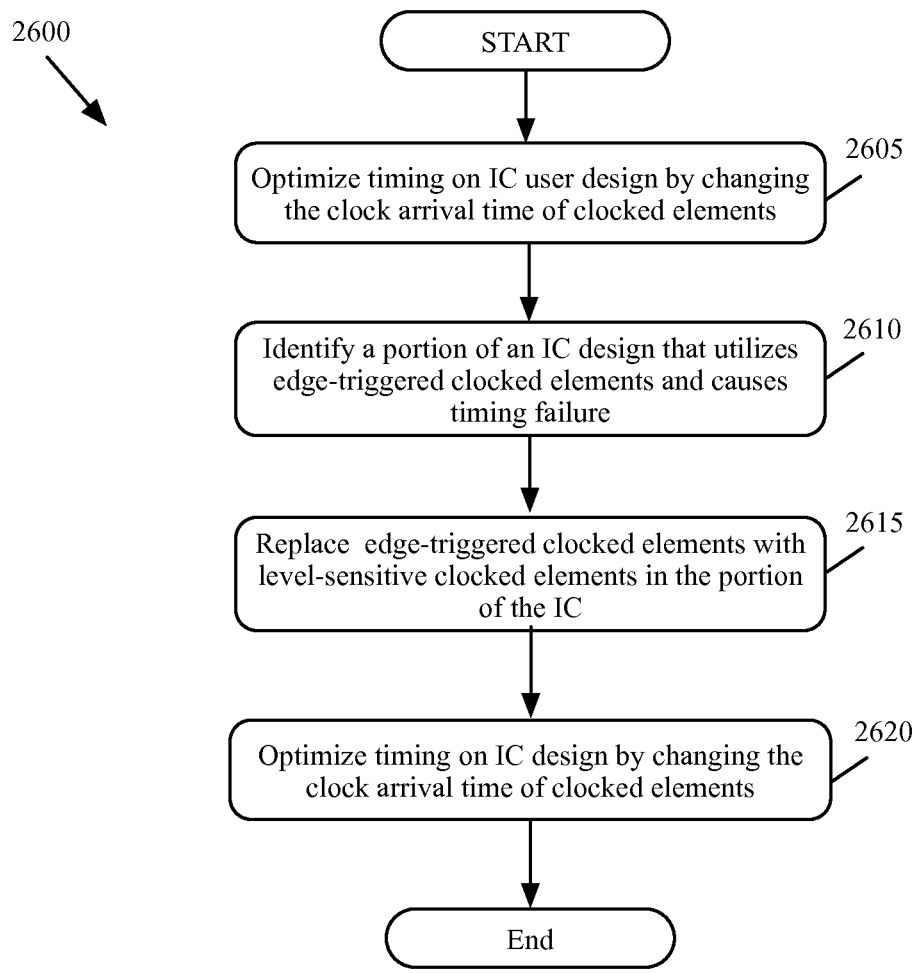
FIG. 26 conceptually illustrates a process that replaces edge-triggered clocked elements with level-sensitive clocked elements in some embodiments of the invention.

FIG. 26 conceptually illustrates a process 2600 that replaces edge-triggered clocked elements with level-sensitive clocked elements in some embodiments of the invention. As shown, the process optimizes (at 2605) timing on an IC user design by changing the clock arrival time of clocked elements. For instance, the process utilizes techniques described in previous sections to perform timing optimization.

The process then identifies (at 2610) a portion of the IC design that utilizes edge-triggered clocked elements and causes timing failure. For instance, the portion of the IC includes one or more paths with a timing that exceeds the maximum allowed time by a predetermined percentage. As described in the next section, some embodiments identify paths in the netlist that have the maximum percentage of timing failure in the IC design and are the reason why the overall IC design does not meet specified timing constraints specified in the user design. In some embodiments the edge-triggered clocked elements are replaced by level-sensitive clocked elements only on the path or paths that waiting for the next clock edge and lack of granularity contributes the timing failure of the IC design.

The process then replaces (at 2615) one or more of the edge-triggered clocked elements with the level-sensitive clock elements in the portion of the IC. For instance, if the IC is an ASIC, replacing the edge-triggered clocked elements with level-sensitive clocked elements requires redesigning the IC hardware. On the other hand, if the IC is an IC with configurable circuits (such as an FPGA) or an IC with reconfigurable circuits, replacing the clocked elements requires configuring some of the configurable circuits of the IC to operate as level-sensitive clocked elements. Once the edge-triggered clocked elements are replaced with the level-sensitive clocked elements, process 2600 reroutes the IC design to use the level-sensitive clocked elements.

The process then optimizes (at 2620) timing on the IC design by changing the clock arrival time of clocked elements. For instance, the process utilizes techniques described in previous sections to perform timing optimization. Some embodiments repeat process 2600 several times until the IC design satisfies timing constraints.

As described above, some embodiments utilize an IC that has logic circuits and interconnect circuits that are n loopered sub-cycle reconfigurable. In these embodiments, the sub-cycles operate as an n phase clock. At each crossing between the consecutive sub-cycles (or between the last sub-cycle of a cycle and the first sub-cycle of the next cycle), the data signals for the sub-cycle is kept in storage elements and are kept until the data is passed to a future sub-cycle, which can be the immediate next sub-cycle or an upcoming cycle. Use of the n phase sub-cycle clock reduces the granularity of adjusting the clock signals for the clocked elements by the order of 1/n. In addition, the storage element that stores the results of computations to pass to future sub-cycles can be treat either as a latch or a register.

If the routing element can be configured to carry the same signal in a previous fold and a successive fold, then it is like having a latch in the middle. Some embodiments utilize a time-via as described by reference to FIGS. 13 and 14, above as a level-sensitive clocked element. Some embodiments utilize a KMUX, a YMUX, or a hybrid storage element as described by reference to FIGS. 15-18 above to provide sub-cycle granularity control.

IV. IDENTIFYING THE REASON WHY TIMING FAILS

Some embodiments perform one or more of the processes described in the previous sections to optimize the circuit performance. If the circuit timing still does not meet the timing constraints of the user design, the user is provided with the cause of the timing failure. The user can then resolve the failure by performing design change to optimize the identified cause of timing failure.

Some embodiments view timing constraints sequentially. These embodiments analyze timing paths over multiple cycles of computation, either from one side of a clock domain to another, or around a loop in the design. The timing path collectively has to meet the time allocated to it. This approach has several advantages. The number of places in the design that are timing critical is much smaller than a traditional timing optimization system. In addition, the optimization is not dependent on where along the path the clocked elements are placed. There is no benefit in balancing the delay between clocked elements. All that matters is the total time budget around a loop or along a path.

This characteristic significantly simplifies RTL development and allows for much greater reuse. For instance, a cyclic redundancy check (CRC) block, which is a combinational function, can be implemented once and used in many places with different number of clocked elements because the clocked elements can be added outside the functional block.

Figure 27:
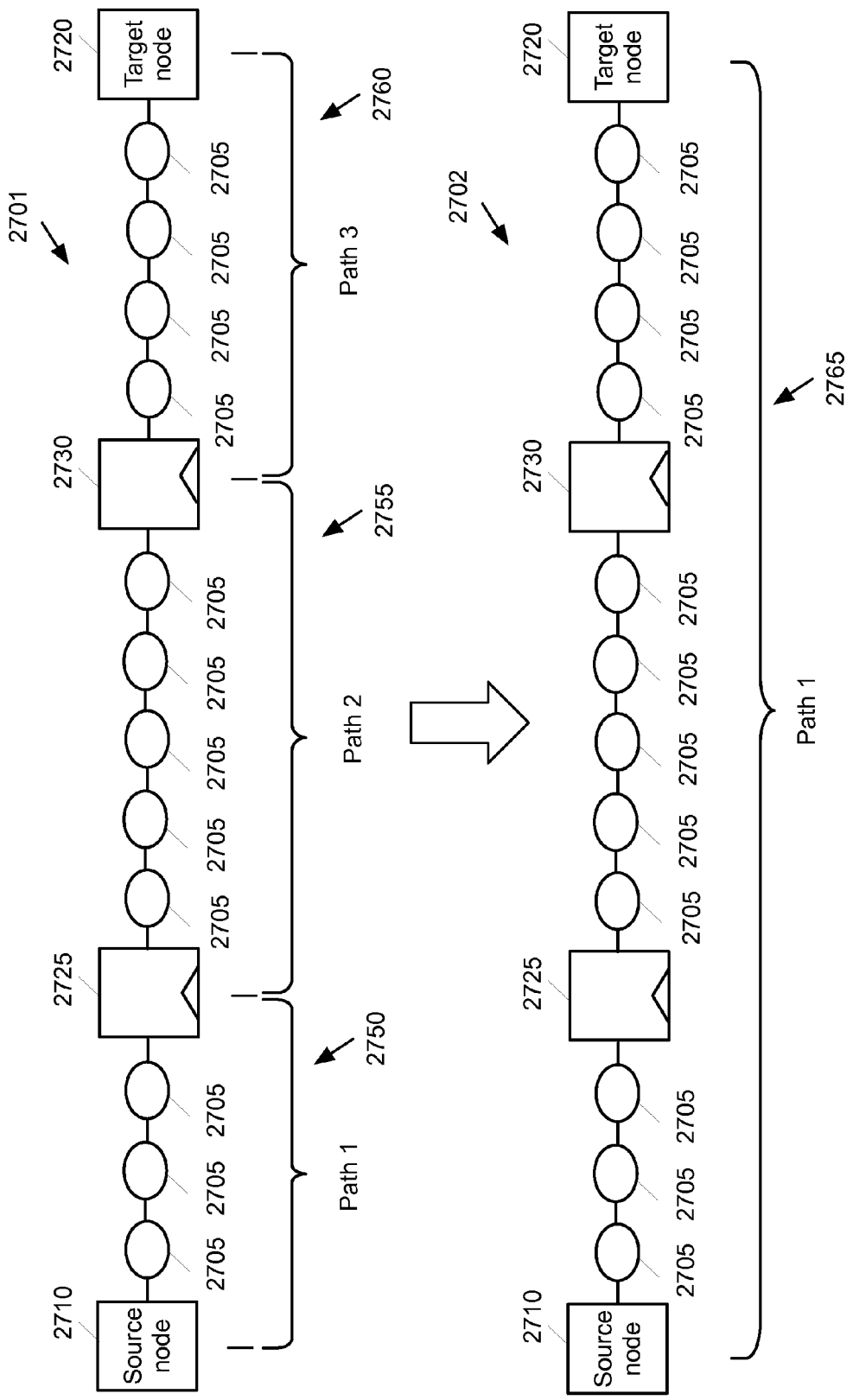
FIG. 27 provides comparison between a sequential timing perspective as provided in some embodiments of the invention and a traditional timing perspective.

FIG. 27 provides comparison between a sequential timing perspective as provided in some embodiments of the invention and a traditional timing perspective. The figure shows a path that starts from a source node 2710 and ends at a target node 2720. Examples of the source node 2710 include the boundary of a clock domain and an input pin. Examples of the target node 2720 include the boundary of a clock domain and an output pin. The path also includes 12 combinational logic elements 2705 and two clocked elements 2725 and 2730. The path, therefore, includes 4 timed elements (a source node, a target node, and two clocked elements). A loop is a path with a single endpoint that serves as both a source node and a target node. As in any other path, a timing failure occurs when the timing required for the logic in the loop path exceeds the time allowed for that path. A person of ordinary skill in the art will realize that descriptions provided herein for optimizing end-to-end paths readily apply to the loops.

In the traditional perspective 2701, there are three paths that have to meet timing constraints. The paths are between the source node 2710 and clocked element 2725, clocked element 2725 and clocked element 2730, and clocked element 2730 and target node 2720. There are therefore three timing constraints, one for each clock period. The maximum frequency is driven by the longest path latency. The final latency is three times the latency of the path with maximum delay.

For instance, assuming that path 2750 (path 1) has 3 ns delay, path 2755 (path 2) has 5 ns delay, and path 2760 (path 3) has 4 ns delay. The maximum frequency is 1 divided by 5 ns=200 MHz. The total latency is 3×5 ns=15 ns.

In the sequential timing perspective 2702, there is only one path 2765. The final latency is the total latency of the path. The maximum frequency is driven by the total latency of the path. Using the same circuits as the transitional perspective example, path 2765 (path 1) delay is 12 ns. Maximum frequency is 3 divided by 12 ns=250 MHz. The total latency is 12 ns.

In a traditional perspective, each path has to individually meet the timing constraint of being less than one clock cycle. In the sequential timing perspective, the clocked elements are shiftable. Therefore, the path that has the maximum delay from a source node to a target node can be identified. Furthermore, some embodiments do not calculate an absolute slack for each path. Instead, the percent of slack along a path is calculated. In each locally most critical path, the percentage of slack is the same along that path.

Accordingly, some embodiments report the percentage of slack along a complete path (or a loop) that can include several clocked elements rather than reporting the slack from clocked element to clocked element. As an example, assume that an end-to-end path or a loop is allowed K unit of time but takes M unit of time (M>K) to complete. The difference (M−K) is how much latency has to be increased or how much delay has to be introduced. The percentage (M/K*100%) indicates how much the path or the loop has to be slowed down in order to run the circuit. This percentage is uniform along the path or the loop. This technique has the advantage of pinpointing the exact path or loop that is the cause of the timing failure and eliminates the need for a user to manually move around the clocked elements to retime the clocked elements in order to meet the timing requirement.

Figure 28:
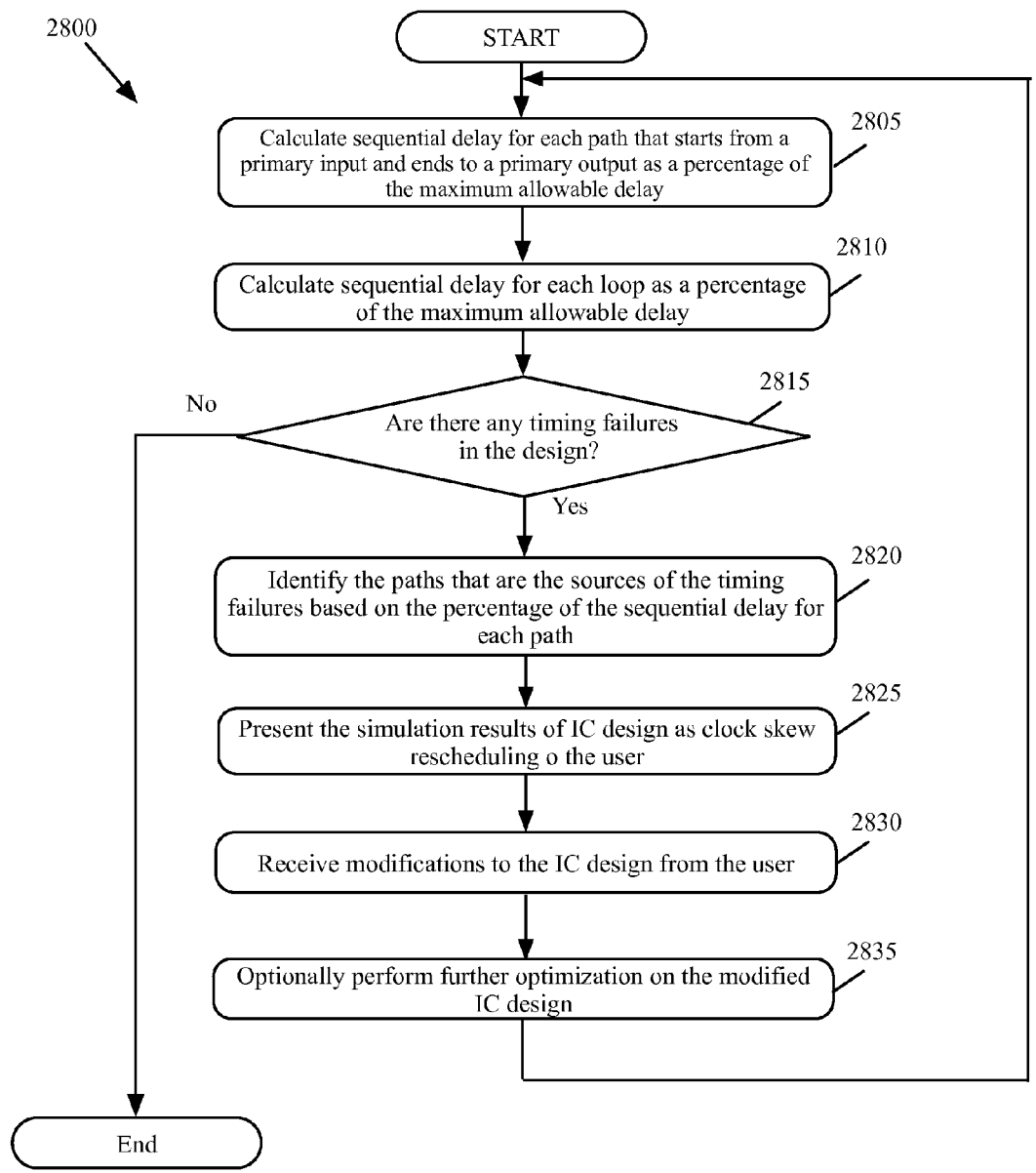
FIG. 28 conceptually illustrates a process that identifies a path that is the cause of timing failures of an IC design in some embodiments of the invention.

FIG. 28 conceptually illustrates a process 2800 that identifies a path that is the cause of timing failures of an IC design in some embodiments of the invention. As shown, the process calculates (at 2805) the sequential delay for each sequential path that starts from a source node and ends at a target node as a percentage of the maximum allowable delay.

The process also calculates (at 2810) sequential delay for each loop as a parentage of the maximum allowable delay. The process then determines (at 2815) whether there are any timing failures in the design. If not, the process ends. Otherwise, the process identifies (at 2820) the paths that are the sources of the timing failures based on the percentage of the sequential delay for each path. The process identifies an entire sequential path from a source node to a target node with plurality of clocked elements as a critical path rather than identifying a path between two timed elements that does not encompass any clocked emblements. For instance, the process identifies a path such as the path between source node 305 and target node 310 shown in FIG. 3 as the critical path rather than identifying the smaller path between the source node 305 and clocked element 345.

The process then presents (at 2825) the simulation results of the IC design as clock skew scheduling to the user. The process then receives (at 2830) modifications to the IC design from the IC designer/user. Examples of modifications to IC design include adding latency to the critical path (i.e., allocate more time for the path or paths identified in operation 2820), decreasing delay in the critical path, for example by reducing the logic in the path, implementing look-ahead logic, eliminating high fan-out control signals such as reset and enable, etc. The process then optionally performs (at 2835) further optimization on the modified IC design. The process then proceeds to 2805, which was described above.

V. ELECTRONIC SYSTEM

Many of the above-described features and applications are implemented as software processes that are specified as a set of instructions recorded on a computer readable storage medium (also referred to as computer readable medium, machine readable medium, machine readable storage). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 29:
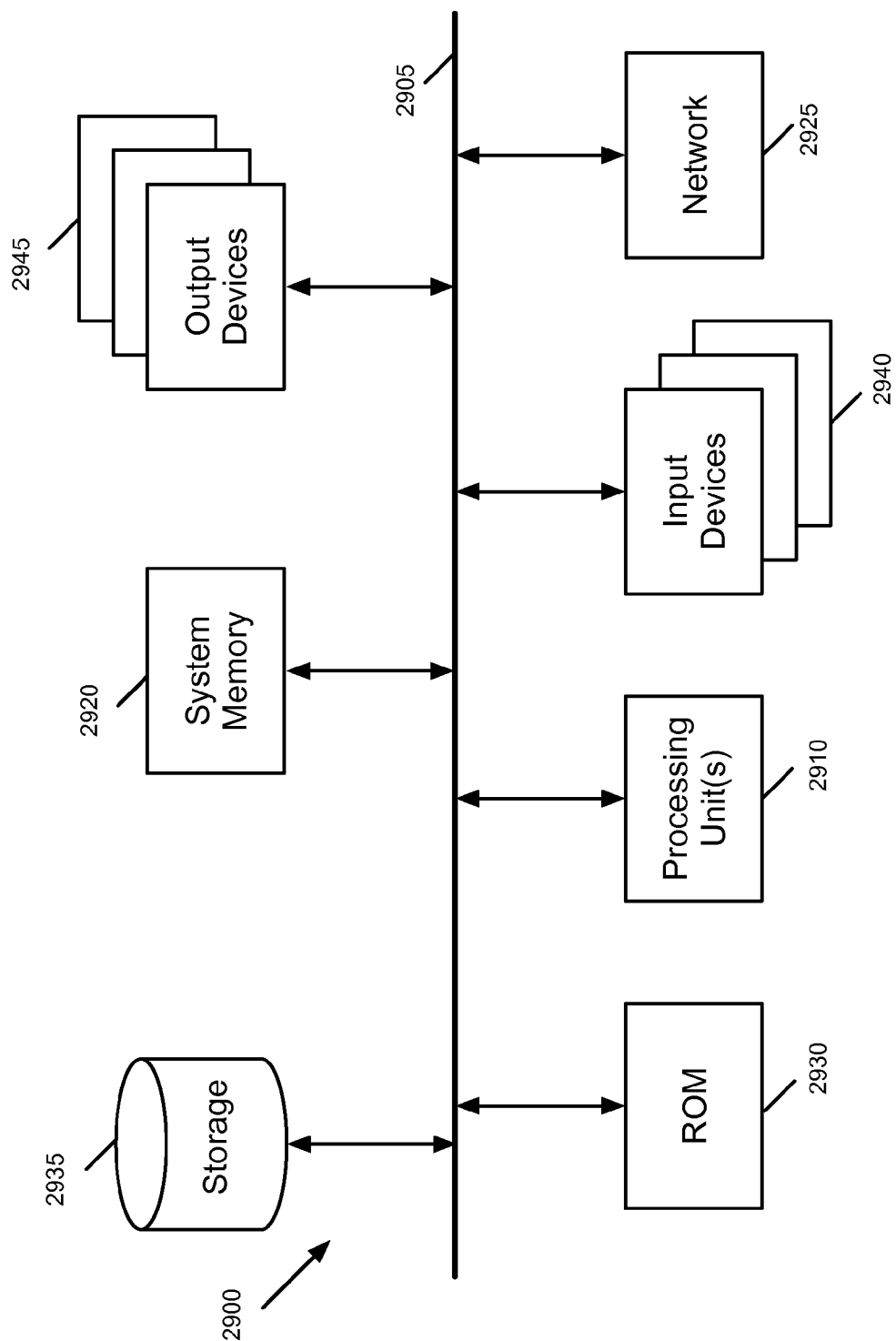
FIG. 29 conceptually illustrates an electronic system with which some embodiments of the invention are implemented.

FIG. 29 conceptually illustrates an electronic system 2900 with which some embodiments of the invention are implemented. The electronic system 2900 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 2900 includes a bus 2905, processing unit(s) 2910, a system memory 2920, a network 2925, a read-only memory 2930, a permanent storage device 2935, input devices 2940, and output devices 2945.

The bus 2905 collectively represents all system, peripheral, and chipset buses that communicatively connect the numerous internal devices of the electronic system 2900. For instance, the bus 2905 communicatively connects the processing unit(s) 2910 with the read-only memory 2930, the system memory 2920, and the permanent storage device 2935.

From these various memory units, the processing unit(s) 2910 retrieves instructions to execute and data to process in order to execute the processes of the invention. The processing unit(s) may be a single processor or a multi-core processor in different embodiments. The read-only-memory (ROM) 2930 stores static data and instructions that are needed by the processing unit(s) 2910 and other modules of the electronic system. The permanent storage device 2935, on the other hand, is a read-and-write memory device. This device is a non-volatile memory unit that stores instructions and data even when the electronic system 2900 is off. Some embodiments of the invention use a mass-storage device (such as a magnetic or optical disk and its corresponding disk drive) as the permanent storage device 2935.

Other embodiments use a removable storage device (such as a floppy disk, flash memory device, etc., and its corresponding disk drive) as the permanent storage device. Like the permanent storage device 2935, the system memory 2920 is a read-and-write memory device. However, unlike storage device 2935, the system memory 2920 is a volatile read-and-write memory, such a random access memory. The system memory 2920 stores some of the instructions and data that the processor needs at runtime. In some embodiments, the invention's processes are stored in the system memory 2920, the permanent storage device 2935, and/or the read-only memory 2930. For example, the various memory units include instructions for processing multimedia clips in accordance with some embodiments. From these various memory units, the processing unit(s) 2910 retrieves instructions to execute and data to process in order to execute the processes of some embodiments.

The bus 2905 also connects to the input devices 2940 and output devices 2945. The input devices 2940 enable the user to communicate information and select commands to the electronic system. The input devices 2940 include alphanumeric keyboards and pointing devices (also called "cursor control devices"), cameras (e.g., webcams), microphones or similar devices for receiving voice commands, etc. The output devices 2945 display images generated by the electronic system or otherwise output data. The output devices 2945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 29, bus 2905 also couples electronic system 2900 to a network 2925 through a network adapter (not shown). In this manner, the computer can be a part of a network of computers (such as a local area network ("LAN"), a wide area network ("WAN"), or an Intranet, or a network of networks, such as the Internet. Any or all components of electronic system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 23, 26, and 28) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method of optimizing timing performance of an IC design, the IC design expressed as a graph comprising a plurality of nodes representing IC components, the method comprising:
    identifying a plurality of paths in the graph, each path starting from a timed source node and ending to a timed target node, each path comprising a plurality of clocked elements and a plurality of computational elements;
    optimizing the timing performance of the IC design by skewing clock signals to one or more clocked elements in a set of paths in the plurality of paths to satisfy a set of timing constraints;
    for each identified path, determining a ratio of data signal travel time from the source node to the destination node to a maximum time allocated for the data signal to travel from the source node to the target node;
    determining that the IC design fails a set of timing constraints when one or more of the paths have a ratio greater than one;
    identifying a path in the plurality of paths that has a maximum determined ratio as a cause for timing failure, wherein the ratio is calculated as a percentage value, and wherein the path that has the maximum determined ratio is identified as the path contributing a highest percentage to an overall timing failure of the IC design;
    generating a retimed design; and
    implementing the IC design using the retimed design.

2. The method of claim 1 further comprising:
    receiving a modification of the user design for the path with the maximum identified ratio; and
    optimizing the timing performance of the modified IC design by skewing clock signals to one or more clocked elements in a set of paths in the plurality of paths to satisfy a set of timing constraints.

3. The method of claim 1, wherein the data signal requires a plurality of clock cycles to travel between the source and target nodes of one or more paths in the plurality of paths.

4. The method of claim 1, wherein a timed source node is one of a primary input through which the IC receives external inputs, a storage element, and a node with timing constraints requiring a clock signal for the node to arrive at a fixed time.

5. The method of claim 1, wherein a timed target node is one of a primary output through which the IC sends outputs to external circuits, a storage element, and a node with timing constraints requiring a clock signal for the node to arrive at a fixed time.

6. The method of claim 1, wherein the plurality of paths in the graph comprises a set of loops, wherein the source node and the target node of each loop is a same node.

7. A non-transitory machine readable medium storing a program for optimizing timing performance of an IC design, the IC design expressed as a graph comprising a plurality of nodes representing IC components, the program executable by at least one processing unit, the program comprising sets of instructions for:
    identifying a plurality of paths in the graph, each path starting from a timed source node and ending to a timed target node, each path comprising a plurality of clocked elements and a plurality of computational elements;

optimizing the timing performance of the IC design by skewing clock signals to one or more clocked elements in a set of paths in the plurality of paths to satisfy a set of timing constraints;

for each identified path, determining a ratio of data signal travel time from the source node to the destination node to a maximum time allocated for the data signal to travel from the source node to the target node;

determining that the IC design fails a set of timing constraints when one or more of the paths have a ratio greater than one;

identifying a path in the plurality of paths that has a maximum determined ratio as a cause for timing failure, wherein the ratio is calculated as a percentage value, and wherein the path that has the maximum determined ratio is identified as the path contributing a highest percentage to an overall timing failure of the IC design;

generating a retimed design; and implementing the IC design using the retimed design.

8. The non-transitory machine readable medium of claim 7, the program further comprising sets of instructions for:

receiving a modification of the user design for the path with the maximum identified ratio; and optimizing the timing performance of the modified IC design by skewing clock signals to one or more clocked elements in a set of paths in the plurality of paths to satisfy a set of timing constraints.

9. The non-transitory machine readable medium of claim 7, wherein the data signal requires a plurality of clock cycles to travel between the source and target nodes of one or more paths in the plurality of paths.

10. The non-transitory machine readable medium of claim 7, wherein a timed source node is one of a primary input through which the IC receives external inputs, a storage element, and a node with timing constraints requiring a clock signal for the node to arrive at a fixed time.

11. The non-transitory machine readable medium of claim 7, wherein a timed target node is one of a primary output through which the IC sends outputs to external circuits, a storage element, and a node with timing constraints requiring a clock signal for the node to arrive at a fixed time.

12. The non-transitory machine readable medium of claim 7, wherein the plurality of paths in the graph comprises a set of loops, wherein the source node and the target node of each loop is a same node.

13. A device comprising:

a set of processing units; and a non-transitory machine readable medium storing a program for execution by at least one of the processing units, the program for optimizing timing performance of an IC design, the IC design expressed as a graph comprising a plurality of nodes representing IC components, the program comprising sets of instructions for:

identifying a plurality of paths in the graph, each path starting from a timed source node and ending to a timed target node, each path comprising a plurality of clocked elements and a plurality of computational elements;

optimizing the timing performance of the IC design by skewing clock signals to one or more clocked elements in a set of paths in the plurality of paths to satisfy a set of timing constraints;

for each identified path, determining a ratio of data signal travel time from the source node to the destination node to a maximum time allocated for the data signal to travel from the source node to the target node;

determining that the IC design fails a set of timing constraints when one or more of the paths have a ratio greater than one;

identifying a path in the plurality of paths that has a maximum determined ratio as a cause for timing failure, wherein the ratio is calculated as a percentage value, and wherein the path that has the maximum determined ratio is identified as the path contributing a highest percentage to an overall timing failure of the IC design;

generating a retimed design; and implementing the IC design using the retimed design.

14. The device of claim 13, the program further comprising sets of instructions for:

receiving a modification of the user design for the path with the maximum identified ratio; and optimizing the timing performance of the modified IC design by skewing clock signals to one or more clocked elements in a set of paths in the plurality of paths to satisfy a set of timing constraints.

15. The device of claim 13, wherein the data signal requires a plurality of clock cycles to travel between the source and target nodes of one or more paths in the plurality of paths.

16. The device of claim 13, wherein a timed source node is one of a primary input through which the IC receives external inputs, a storage element, and a node with timing constraints requiring a clock signal for the node to arrive at a fixed time.

17. The device of claim 13, wherein a timed target node is one of a primary output through which the IC sends outputs to external circuits, a storage element, and a node with timing constraints requiring a clock signal for the node to arrive at a fixed time.

18. The device of claim 13, wherein the plurality of paths in the graph comprises a set of loops, wherein the source node and the target node of each loop is a same node.

* * * * *